United States Patent
Hazlett

(12) 
(10) Patent No.: US 11,487,024 B2
(45) Date of Patent: Nov. 1, 2022

(54) DETERMINING GEOGRAPHIC LOCATION OF A MOBILE DEVICE USING SENSOR DATA

(71) Applicant: Futurewei Technologies, Inc., Plano, TX (US)

(72) Inventor: Andrew Hazlett, San Jose, CA (US)

(73) Assignee: FUTUREWEI TECHNOLOGIES, INC, Plano, TX (US)

(*) Notice: Subject to any disclaimer, the term of this patent is extended or adjusted under 35 U.S.C. 154(b) by 917 days.

(21) Appl. No.: 16/254,093

(22) Filed: Jan. 22, 2019

(65) Prior Publication Data

US 2020/0233096 A1 Jul. 23, 2020

(51) Int. Cl.
*G01C 5/06* (2006.01)
*G01S 19/47* (2010.01)
(Continued)

(52) U.S. Cl.
CPC .............. *G01S 19/47* (2013.01); *G01C 5/06* (2013.01); *G01C 21/165* (2013.01); *G01C 21/30* (2013.01); *G01S 17/42* (2013.01); *H04W 4/024* (2018.02)

(58) Field of Classification Search
CPC ........ G01C 5/06; G01C 21/165; G01C 21/30; G01S 19/47
(Continued)

(56) References Cited

U.S. PATENT DOCUMENTS 8,566,034 B1 10/2013 Van Wyck Loomis
8,718,932 B1 5/2014 Pack et al.
(Continued)

FOREIGN PATENT DOCUMENTS

CN 101586962 A 11/2009
CN 104330081 A 2/2015
(Continued)

OTHER PUBLICATIONS

Pereira et al. "An off-line map-matching algorithm for incomplete map databases," European Conference of Transport Research Institutes (ECTRI) 2009, 18 pages, Sep. 11, 2009.
(Continued)

*Primary Examiner* — Harry K Liu
(74) *Attorney, Agent, or Firm* — Slater Matsil, LLP

(57) ABSTRACT

In certain embodiments, a mobile device includes a sensor, one or more processors, and a memory. The memory stores computer-executable instructions that, when executed by the one or more processors, cause the one or more processors to perform operations including determining a first geographic location based on wireless signals received as part of a wireless-based mobile device positioning system. The operations include accessing a geographic database that includes data representing a number of geographic locations and properties associated with the geographic locations, and a mapping between measureable values of a type and particular geographic locations. The operations include determining, using the geographic database, candidate geographic locations for adjusting the first geographic location. The operations include accessing a particular value of the type determined according to a measurement of the sensor and determining a second geographic location based on the candidate geographic locations and on the particular value and the mapping.

20 Claims, 11 Drawing Sheets

(51) Int. Cl.
*G01C 21/16* (2006.01)
*G01S 17/42* (2006.01)
*G01C 21/30* (2006.01)
*H04W 4/024* (2018.01)

(58) Field of Classification Search
USPC .................................................... 342/357.3
See application file for complete search history.

(56) References Cited

U.S. PATENT DOCUMENTS

| | | |
|---|---|---|
| 2010/0131198 A1 | 5/2010 | Chang et al. |
| 2011/0208426 A1 | 8/2011 | Zheng et al. |
| 2013/0151146 A1 | 6/2013 | Syed et al. |
| 2015/0153178 A1 | 6/2015 | Koo et al. |
| 2016/0146616 A1 | 5/2016 | Ren |
| 2016/0335923 A1 | 11/2016 | Hofmann et al. |
| 2017/0314934 A1 | 11/2017 | Averbuch et al. |
| 2018/0080775 A1 | 3/2018 | Loomis |
| 2018/0172456 A1 | 6/2018 | Sambongi |
| 2019/0316929 A1* | 10/2019 | Shin ................ G01C 21/30 |

FOREIGN PATENT DOCUMENTS

| | | |
|---|---|---|
| CN | 104678415 A | 6/2015 |
| EP | 3361218 A1 | 8/2018 |
| WO | 2009061058 A1 | 5/2009 |

OTHER PUBLICATIONS

Xi et al. "Map Matching Algorithm and its Application," International Journal of Computational Intelligence Systems, 7 pages, Oct. 2007.

Pinar Oguz-Ekim et al, "Proof of Concept Study Using DSRC, IMU and Map Fusion for Vehicle Localization in GNSS-Denied Environments," 2016 IEEE 19th International Conference on Intelligent Transportation Systems (ITSC) Windsor Oceanico Hotel, Rio de Janeiro, Brazil, Nov. 1-4, 2016, 6 pages.

* cited by examiner

FIG. 3

| GEOGRAPHIC DATA ||||||||
| GEOGRAPHIC LOCATION | NodeID | ROAD HEADING (DEGREE) | ALTITUDE (METERS) | LOCAL MAGNETIC FIELD EVENT (MICROTESLA) | LIGHT INTENSITY (LUX) | 3-D POINT CLOUD GEOGRAPHIC POSITION |
|---|---|---|---|---|---|---|
| POSITION A | 13846 | 250.1 | 4.5 | -40.1 | 2512 | 3D LOCAL MODEL 1 |
| POSITION B | 13847 | 259.6 | 4.4 | -39.6 | 2678 | 3D LOCAL MODEL 2 |
| POSITION C | 13848 | 256.7 | 4.3 | -39.8 | 2432 | 3D LOCAL MODEL 3 |
| POSITION D | 13849 | 253.4 | 4.3 | -39.6 | 572 | 3D LOCAL MODEL 4 |
| POSITION E | 13850 | 249.5 | 3.0 | 92.8 | 113 | 3D LOCAL MODEL 5 |
| POSITION F | 13851 | 250.7 | -0.3 | -40.7 | 135 | 3D LOCAL MODEL 6 |
| POSITION G | 13852 | 264.7 | -3.8 | -210.8 | 317 | 3D LOCAL MODEL 7 |
| POSITION H | 13853 | 276.1 | -8.3 | -43.2 | 118 | 3D LOCAL MODEL 8 |
| POSITION I | 13854 | 278.1 | -10.8 | -170.3 | 330 | 3D LOCAL MODEL 9 |
| POSITION J | 13855 | 279.2 | -12.0 | -35.2 | 158 | 3D LOCAL MODEL 10 |
| POSITION K | 13856 | 268.3 | -9.3 | -20.3 | 172 | 3D LOCAL MODEL 11 |
| POSITION L | 13857 | 255.0 | -8.0 | 37.9 | 310 | 3D LOCAL MODEL 12 |
| POSITION M | 13858 | 259.9 | -3.2 | -38.4 | 562 | 3D LOCAL MODEL 13 |
| POSITION N | 13859 | 271.6 | 0.3 | 85.3 | 1120 | 3D LOCAL MODEL 14 |
| POSITION O | 13860 | 274.7 | 2.8 | -39.4 | 2018 | 3D LOCAL MODEL 15 |
| POSITION P | 13861 | 269.9 | 5.3 | -95.7 | 2576 | 3D LOCAL MODEL 16 |
| POSITION Q | 13862 | 257.4 | 10.4 | -39.8 | 2487 | 3D LOCAL MODEL 17 |
| ... | | | | | | |
| POSITION NNN | | | | | | |

DETERMINING GEOGRAPHIC LOCATION OF A MOBILE DEVICE USING SENSOR DATA

TECHNICAL FIELD

The present disclosure relates generally to determining a geographic location of a mobile device, and more particularly to determining a geographic location of a mobile device using sensor data.

BACKGROUND

It is often desirable for a mobile device, such as a smartphone or vehicle, to determine its geographic location. The mobile device (or another entity) may use the determined geographic location of the mobile device for a variety of applications. For example, the geographic location may be used by a navigation application on the mobile device to provide routing information to a user of the mobile device. As another example, the geographic location may be used by an application of the mobile device to suggest businesses or services in proximity to the mobile device. As another example, the geographic location may be used to track freight or the progress of a package or other material in transit to a destination such as a residence. As another example, the geographic location may be used to facilitate traffic engineering, such as for self-driving vehicles. A mobile device may determine its geographic location using a global navigation satellite system (GNSS), such as the Global Positioning System (GPS). Other forms of wireless communication, such as BLUETOOTH, Wi-Fi, or cellular communication, may be used to determine the geographic location of the mobile device.

SUMMARY

In certain embodiments, a mobile device includes a gyroscope, a processor, and a memory. The memory stores computer-executable instructions that, when executed by the processor, cause the processor to perform operations including determining a first geographic location based on wireless signals received as part of a wireless-based mobile device positioning system. The instructions further include accessing a geographic database that includes a first mapping between road headings and particular geographic locations. The operations further include accessing a particular heading determined according to a measurement of the gyroscope and determining, based on the first geographic location, the particular heading, and the first mapping between road headings and particular geographic locations, a second geographic location.

In certain embodiments, a mobile device includes a first sensor, a processor, and a memory. The memory stores computer-executable instructions that, when executed by the processor, cause the processor to perform operations including determining a first geographic location based on wireless signals received as part of a wireless-based mobile device positioning system. The operations include accessing a geographic database that includes geographic locations and associated properties and a first mapping between measureable values of a first type and particular geographic locations. The operations include determining, using the geographic database, candidate geographic locations for adjusting the first geographic location. The operations include accessing a particular value of the first type determined according to a measurement of the first sensor and determining, based on the candidate geographic locations and on the particular value and the first mapping, a second geographic location.

In certain embodiments, a mobile device includes a first sensor, a second sensor, a processor, and a memory. The memory stores computer-executable instructions that, when executed by the processor, cause the processor to perform operations including accessing a geographic database. The geographic database includes geographic locations and associated properties, a mapping between measureable values of a first type and particular geographic locations, and a mapping between measureable values of a second type and particular geographic locations. The operations include determining, using the geographic database, candidate geographic locations for adjusting a first geographic location, accessing a particular value of the first type determined according to a measurement of the first sensor, and determining a second geographic location based on the candidate geographic locations, the particular value of the first type, and the mapping between the measurable values of the first type and particular geographic locations. The operations include determining whether the second geographic location is reliable. The operations include accessing, in response to determining that the second geographic location is unreliable, a particular value of the second type determined according to a measurement of the second sensor and determining, based on the candidate geographic locations, the particular value of the second type, and the mapping between the measurable values of the second type and particular geographic locations, a third geographic location.

Embodiments of the present disclosure may provide one or more technical advantages. For example, certain embodiments may allow a geographic location of a mobile device to be determined even when a generally accurate wireless-based mobile device positioning system, such as a global navigation satellite system (GNSS), becomes unavailable. Certain embodiments may allow a geographic location of a mobile device to be adjusted in multiple dimensions, which may correct a determined geographic location. For example, rather than simply relying on position propagation based on output from an accelerometer, which can be error prone, and using map matching to determine a closest road, embodiments of this disclosure access measurements from other sensors of the mobile device and compare information determined from those measurements and geographic data stored in geographic database to determine a particular geographic location that corresponds to the information determined from the sensor measurements. This may allow so-called along-track errors to be corrected (e.g., correction to a particular location along a road), as well as so-called across-track errors (e.g., correction to a correct road). Furthermore, depending on the particular data that is included in the geographic database and the particular sensors available on the mobile device, the multi-dimensional correction could also include a correction in a third dimension (e.g., based on an altitude of the mobile device determined according to measurements of an altitude sensor). It should be understood that references throughout this description to "correct," "correction," "correcting" or the like of a geographic may, or may not, result in the determination of a perfectly correct physical geographic location of a mobile device. Embodiments of this disclosure provide techniques for confirming and/or adjusting a geographic location to potentially improve the accuracy of the determined geographic location or to provide an ability to determine a geographic location based on available information when other techniques for determining a geographic location are unavailable.

As another example, certain embodiments may allow data from a variety of types of sensors of a mobile device to be compared to geographic data to determine a geographic location of the mobile device. As described above, in certain embodiments, the data from the additional sensors may provide additional dimensions to a determined geographic location or corrections to a geographic location. In certain embodiments, the data from the variety of sensors may be used as backup that is analyzed if the mobile device is unable to determine a unique geographic location based on data from another sensor.

In certain embodiments, certain sensors of a mobile device and their associated measurements generally are available to the mobile device even when a wireless-based mobile device positioning system may not be available. For example, sensors and their associated measurements generally are available to the mobile device even when the mobile device is unable to determine a reliable geographic location using the GNSS. Thus, an ability to determine a geographic location of the mobile device based on data from one or more of the sensors may provide an ability to continue to determine a geographic location of the mobile device even when the wireless-based mobile device positioning system is unavailable or otherwise unreliable.

Certain embodiments of the present disclosure may provide some, all, or none of the above advantages. Certain embodiments may provide one or more other technical advantages, one or more of which may be readily apparent to those skilled in the art from the figures, descriptions, and claims included in this disclosure.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3 is a table illustrating example geographic data of a geographic database, according to certain embodiments of the present disclosure;

DETAILED DESCRIPTION OF ILLUSTRATIVE EMBODIMENTS

Figure 1:
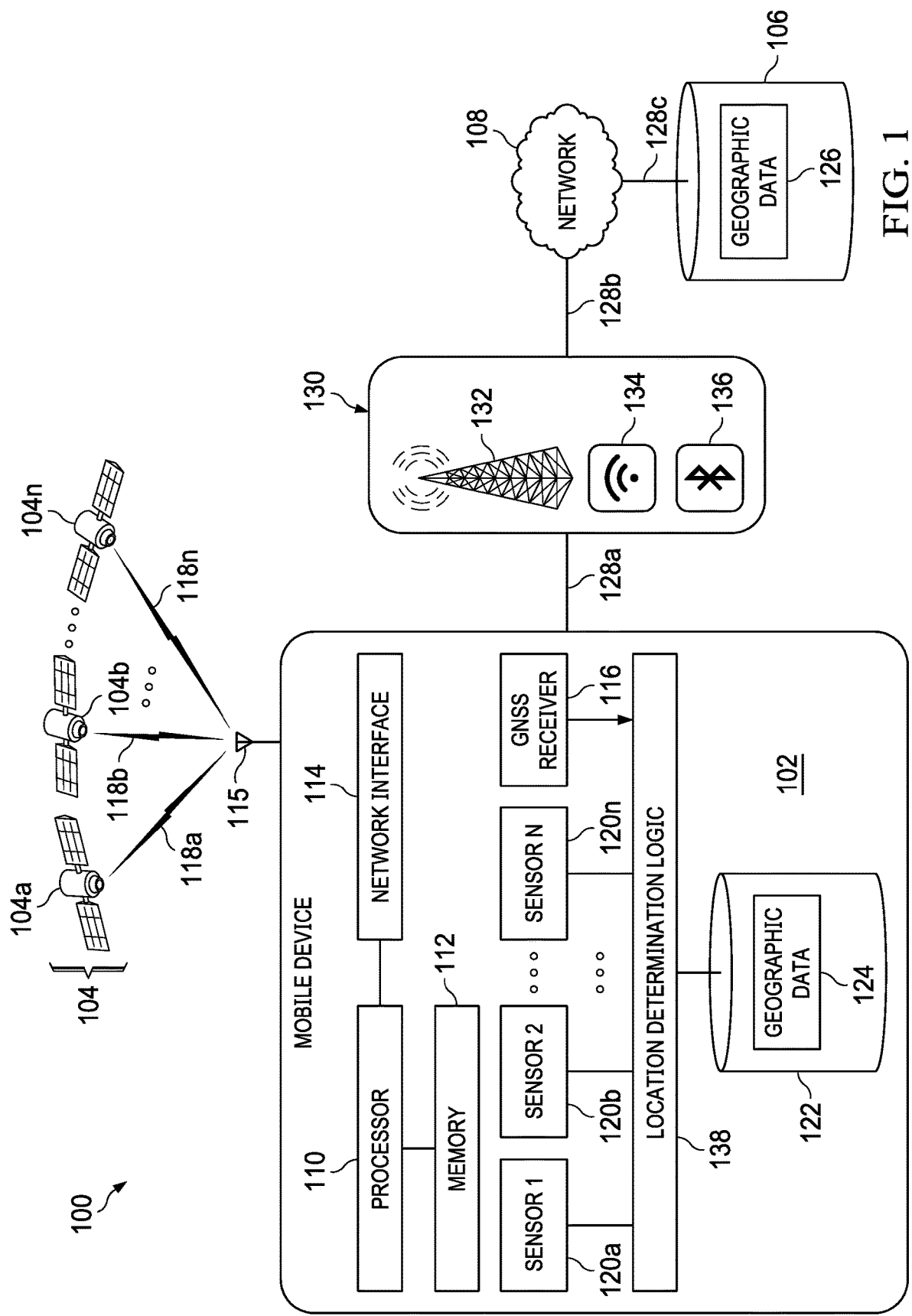
FIG. 1 illustrates an example system for determining a geographic location of a mobile device using sensor data, according to certain embodiments of the present disclosure.

As described above, a mobile device may determine its geographic location in a variety of ways, including using a GNSS and/or using other forms of wireless communication, such as BLUETOOTH, Wi-Fi, cellular communication, etc. These forms of geographic location determination rely on an ability of the mobile device to communicate wirelessly with a component external to the mobile device (e.g., with one or more satellites, another BLUETOOTH component, a Wi-Fi access point, a cellular base station, etc.). A mobile device may lose its ability to communicate wirelessly with these other external components or may experience reduced signal quality (e.g., reduced signal strength or reduced signal-to-noise ratio) when communicating wirelessly with these other external components, either of which may hinder the ability of the mobile device to determine its geographic location using these wireless-based systems within an acceptable degree of accuracy, depending on the particular implementation. For example, the mobile device may enter a tunnel, an area of dense tree cover, or an urban canyon (e.g., an area among skyscrapers), which may prevent the mobile device from receiving signals from GNSS satellites or otherwise degrade the quality of the signals wirelessly communicated to and/or received from other components that are external to the mobile device.

One way in which a mobile device may continue to determine its geographic location when a GNSS signal, for example, is unavailable is using a combination of map matching and output from an accelerometer. For example, the mobile device may propagate to a current location from a last known location based on information from an accelerometer (e.g., using output from the accelerometer to estimate a distance traveled from the last known location) and use map data to match the current location to a nearest road. A problem with this technique, however, is that at best the technique just corrects for across track location errors, putting the current location on the nearest road. In general, accelerometer output is not very accurate, and that inaccuracy grows over time. While map matching may return the current location to the correct road, over time the error caused by accelerometer drift eventually causes the map matching technique to determine an incorrect road and also does not accurately indicate the location along the determined road.

Embodiments of the present disclosure address these and other issues. For example, geographic data (which may be stored on the network and retrieved by the mobile device as appropriate) includes other data that can be associated with particular geographic locations, potentially uniquely within a given area. This other data may include data that can be measured by one or more sensors on the mobile device, sensors that may be available to the mobile device even if the wireless-based mobile device positioning system (e.g., the GNSS) is not. For example, for each of a number of geographic locations, the geographic data may include one or more properties, such as a road heading, an altitude, a local magnetic field, a light intensity, a three-dimensional (3D) point cloud geographic position, and any other suitable properties. The mobile device may compare measurements of one or more sensors on the mobile device to these geographic data to determine a geographic location of the mobile device. A few example sensors are described below.

As a first example sensor, a gyroscope of the mobile device may be used to determine a heading of the mobile device, and this heading may be compared to the geographic data to determine a geographic location associated with that heading. In certain embodiments, the gyroscope provides more accurate measurements over time than the accelerometer, so the heading (determined according to measurements of the gyroscope) may provide a more reliable way to perform map matching, particularly on a curve where the heading changes over time (such that the heading can be uniquely matched to a geographic location within a reasonable distance of the last determined location of the mobile device). The heading may be used not only to facilitate matching to a particular road, but also to a particular location on the road that is more accurate than the location that could be determined using the accelerometer. This correction is referred to as correcting along track errors.

As a second example sensor, an altitude sensor (e.g., an altimeter or pressure sensor) may be used to determine an altitude of a mobile device. Altitudes may be mapped to unique geographic locations, which again may help correct along track errors. Furthermore, measurements from altitude sensors and comparisons to geographic data that includes altitude as a property of geographic locations may also help resolve on which road in a set of stacked roads a mobile device is located.

As a third example sensor, a magnetometer may register unique local magnetic field events that can be mapped to particular locations. For example, each time a mobile device passes a metal sign on a road, a unique pattern may be registered by the magnetometer that can be mapped to a particular location using the geographic data.

Other types of sensors can be used in a similar way (e.g., light sensors to measure light intensity and light detection and ranging (LiDAR) sensors to measure three-dimensional point cloud geographic positions).

Furthermore, these sensors may be used in combination to provide a variety of techniques for determining and verifying the location of the mobile device.

In certain embodiments, a mobile device includes a first sensor, a processor, and a memory. The memory stores computer-executable instructions that, when executed by the processor, cause the processor to perform operations including determining a first geographic location based on wireless signals received as part of a wireless-based mobile device positioning system. The operations include accessing a geographic database that includes geographic locations and associated properties and a first mapping between measureable values of a first type and particular geographic locations. The operations include determining, using the geographic database, candidate geographic locations for adjusting the first geographic location. The operations include accessing a particular value of the first type determined according to a measurement of the first sensor and determining, based on the candidate geographic locations and on the particular value and the first mapping, a second geographic location.

In certain embodiments, a mobile device includes a gyroscope, a processor, and a memory. The memory stores computer-executable instructions that, when executed by the processor, cause the processor to perform operations including determining a first geographic location based on wireless signals received as part of a wireless-based mobile device positioning system. The instructions further include accessing a geographic database that includes a first mapping between road headings and particular geographic locations. The operations further include accessing a particular heading determined according to a measurement of the gyroscope and determining, based on the first geographic location, the particular heading, and the first mapping between road headings and particular geographic locations, a second geographic location.

In certain embodiments, a mobile device includes a first sensor, a second sensor, a processor, and a memory. The memory stores computer-executable instructions that, when executed by the processor, cause the processor to perform operations including accessing a geographic database. The geographic database includes geographic locations and associated properties, a mapping between measureable values of a first type and particular geographic locations, and a mapping between measureable values of a second type and particular geographic locations. The operations include determining, using the geographic database, candidate geographic locations for adjusting a first geographic location. The operations include accessing a particular value of the first type determined according to a measurement of the first sensor and determining, based on the candidate geographic locations, the particular value of the first type, and the mapping between the measurable values of the first type and particular geographic locations, a second geographic location. The operations include determining whether the second geographic location is reliable. The operations include accessing, in response to determining that the second geographic location is unreliable, a particular value of the second type determined according to a measurement of the second sensor and determining, based on the candidate geographic locations, the particular value of the second type, and the mapping between the measurable values of the second type and particular geographic locations, a third geographic location.

FIG. 1 illustrates an example system 100 for determining a geographic location of a mobile device using sensor data, according to certain embodiments of the present disclosure. In the illustrated example, system 100 includes mobile device 102, satellites 104, geographic database 106, and network 108. In general, mobile device 102 accesses data from one or more sensors (or data determined from measurements of one or more sensors), compares that data to geographic data accessed from geographic database 106, and determines a geographic location of mobile device 102 based on the comparison. The determined geographic location of mobile device 102 may be communicated to one or more other systems, such as a navigation application of mobile device 102.

For purposes of this disclosure, a geographic location may include an identifier of a position that has one or more dimensions. The position may be a position on the surface of Earth; however, this disclosure contemplates the position being above or below the surface of the Earth if appropriate. In certain embodiments, the geographic location is a two-dimensional location that is represented as latitude and longitude. In certain embodiments, the geographic location is a three-dimensional location that is represented as latitude, longitude, and altitude. Although these particular examples are described, this disclosure contemplates the geographic location having any suitable number of dimensions and any suitable units, according to particular implementations. Throughout this disclosure, the terms geographic location, geographic position, location, and position may be used interchangeably.

Mobile device 102 includes any processing device that is configured to operate and/or communicate in system 100, such as any processing device that is configured to transmit and/or receive wireless signals. For example, mobile device 102 represents any suitable end user device and may include such devices (or may be referred to) as a user equipment/ device (UE), wireless device, wireless transmit/receive unit (WTRU), mobile station, fixed or mobile subscriber unit, pager, cellular telephone, personal digital assistant (PDA), smartphone, laptop, computer, touchpad, wireless sensor, vehicle, wearable device, or consumer electronics device. Although described as being mobile, this disclosure contemplates mobile device 102 being any processing device that can communicate wirelessly and may determine its location.

Mobile device 102 includes a processor 110, memory 112, and network interface 114. Processor 110 includes any combination of hardware, firmware, and software that operates to control and process information. Processor 110 may be a programmable logic device, a central processing unit, a microcontroller, a microprocessor, a digital signal processor, a field programmable gate array, an application specific integrated circuit, any processing device, or any combination of the preceding. Processor 110 may be configured to read and process instructions stored in memory 112. Although illustrated as a single functional unit, this disclosure contemplates mobile device including any suitable number of processors.

Memory 112 stores, either permanently or temporarily, data, operational instructions (e.g., software), or other information for access and/or execution by processor 110. Memory 112 includes any one or a combination of volatile or non-volatile local or remote devices for storing information. For example, memory 112 may include static or dynamic random access memory (RAM), read-only memory (ROM), magnetic storage devices, optical storage devices, hard disks, subscriber identity module (SIM) cards, memory sticks, secure digital (SD) memory cards, or any other information storage device or a combination of these devices. In certain embodiments, at least a portion of memory 112 is non-transitory. Although a single memory 112 is illustrated, mobile device 102 may include any number of memories 112. Among other potential data, memory 112 stores programming for execution by the processor 110 to cause processor 110 to perform operations associated with mobile device 102.

Network interface 114 includes wired links, such as an Ethernet cable or the like, and/or wireless links to access nodes or different networks. Network interface 114 allows the processor 110 to communicate with remote devices via a network, such as network 108. For example, network interface 114 may provide wireless communication via one or more antennas 115 (e.g., one or more transmitters/transmit antennas and one or more receivers/receive antennas). In an embodiment, processor 110 is coupled to a local-area network (LAN) or a wide-area network (WAN) for data processing and communications with remote devices, such as other processing units, the Internet, remote storage facilities, or the like.

Mobile device 102 includes GNSS receiver 116. GNSS receiver 116 is capable of receiving wireless signals 118 from satellites 104. Satellites 104 may be a part of the GNSS. Throughout this disclosure, references to GNSS may include GNSS or any of its variants, such as the Global Positioning System (GPS), Galileo, BeiDou, the Global Navigation Satellite System (GLONASS), Indian Regional Navigation Satellite System (IRNSS, or NAVIC), or any other suitable satellite-based positioning system. This disclosure contemplates system 100 including any suitable number of satellites 104.

Satellites 104 transmit wireless signals 118 that can be received by mobile devices (e.g., mobile device 102) that are appropriately equipped to receive wireless signals 118 from satellites 104. For example, satellite 104a transmits wireless signals 118a, satellite 104b transmits wireless signals 118b, and wireless satellite 104n transmits wireless signals 118n. In certain embodiments, satellites 104 transmit wireless signals 118 by broadcasting wireless signals 118, although this disclosure contemplates satellites transmitting wireless signals 118 in any suitable manner.

A mobile device 102 that is appropriately equipped to receive wireless signals 118 from satellites 104 includes an appropriate GNSS receiver 116 for receiving wireless signals 118 from a particular type of satellite 104. As just one example, if satellite 104a is part of the GPS, then mobile device 102 may be capable of receiving wireless signals 118a transmitted by satellite 104a if the GNSS receiver 116 of mobile device 102 is a GPS-compatible receiver capable of receiving wireless signals 118a that are GPS signals.

GNSS receiver 116 may be implemented for operation in any suitable type of GNSS, such as the GPS, Galileo, BeiDou, the GLONASS, the IRNSS (or NAVIC), or any other suitable satellite-based positioning system. Furthermore, this disclosure contemplates mobile device 102 including a GNSS receiver 116 that is capable of operating in more than one of these types of GNSSs or including multiple GNSS receivers 116, each capable of operating in one or more of these types of GNSSs. GNSS receiver 116 may be implemented using any suitable combination of hardware, firmware, and software.

In certain embodiments, GNSS receiver 116 is configured to process the wireless signals 118 received from satellites 104 to determine a geographic location of mobile device 102. GNSS receiver 116 may then provide the determined location to another component of mobile device 102 (e.g., to location determination logic 138, described below). Additionally or alternatively, GNSS receiver 116 may provide the received wireless signals 118 (or signals or information derived from wireless signals 118) to another component of mobile device 102 (e.g., to location determination logic 138, described below), so that the other component can determine a geographic location of mobile device 102 based on the received wireless signals 118.

The geographic location determined from wireless signals 118 may have one or more dimensions. In certain embodiments, the geographic location is a two-dimensional location that is represented as latitude and longitude. In certain embodiments, the geographic location is a three-dimensional location that is represented as latitude, longitude, and altitude. Although these particular examples are described, this disclosure contemplates the geographic location determined from wireless signals 118 having any suitable number of dimensions and any suitable units, according to particular implementations.

Mobile device includes one or more sensors 120. Sensors 120 of mobile device 102 are configured to measure various characteristics of mobile device 102 and/or characteristics of the environment in proximity to mobile device 102. Each sensor 120 is configured to provide measurements that can be used to determine a value of a particular type. The sensor 120 itself may determine the value of the particular type or the sensor 120 may provide the measurement(s) (or some value derived from those measurements) to another component (e.g., location determination logic 138, described below), so that the other component can determine the value of the particular type. Examples types of sensors and values of particular types are described below.

Sensors 120 may include one or more inertial sensors configured to determine inertial characteristics of mobile device 102 (e.g., due to movement of mobile device 102) and/or one or more non-inertial sensors. In certain embodiments, sensor 120 includes one or more of an accelerometer, a gyroscope, an altitude sensor, a magnetometer, a light sensor, a LiDAR sensor, and/or any other suitable type of sensor.

An accelerometer measures acceleration of mobile device 102 due to movement of mobile device 102. It may be possible to estimate the distance that mobile device 102 has traveled using the acceleration measured by accelerometer. For example, integrating the measured acceleration twice may provide an estimate of the distance traveled by mobile device 102. In general, however, the estimate of distance traveled (as determined from measurements of an accelerometer) is inaccurate, and that inaccuracy grows over time.

A gyroscope measures angular velocity of mobile device 102 due to movement of mobile device 102. The angular velocity may be used to determine a heading for mobile device 102. For example, integrating the measured angular velocity may provide a heading. The heading may also be considered the direction of travel of mobile device 102. In general, a heading determined according to measurements of a gyroscope is reasonably accurate.

An altitude sensor, which may include an altimeter and/or a pressure sensor, measures an altitude of an object above a fixed level and may be used to determine an altitude of mobile device 102. For example, an altitude sensor in mobile device 102 may be used to determine an altitude of mobile device 102 relative to sea level or some other appropriate fixed level.

A magnetometer measures magnetic forces, particularly the Earth's magnetism. For example, the magnetometer may measure the local magnetic field around mobile device 102, which may vary depending on the presence of various objects, such as metal objects (e.g., metal strips in or on the road, metal signs, etc.) in proximity to mobile device 102. Because in some implementations a magnetometer may be used as a compass, the terms magnetometer and compass may be used interchangeably in this disclosure.

A light sensor (e.g., a photoelectric sensor or photo sensor) may "measure" light by converting light energy into an electrical output signal. The light sensor may measure an intensity of light in proximity to mobile device 102.

A LiDAR sensor detects aspects of the environment around the mobile device in which the LiDAR sensor is installed. For example, the LiDAR sensor, including associated software, may use laser beams to detect the presence of objects around mobile device and where mobile device 102 is in relation to those objects. As a particular example, a LiDAR sensor may determine a three-dimensional point cloud geographic position of mobile device 102.

Although this disclosure describes mobile device 102 including particular types of sensors 120, this disclosure contemplates mobile device 102 including some, none, or all of these sensors, as well as other sensors, as appropriate. In other words, this disclosure contemplates mobile device 102 including any suitable types and number of sensors 120. Furthermore, although illustrated separately, this disclosure contemplates sensors 120 being combined in any suitable manner. For example, as described below with reference to FIG. 2, the accelerometer, the gyroscope, and the magnetometer (and any other suitable sensors) may be combined into a self-contained unit called an inertial measurement sensor (IMU). Sensors 120 may be implemented using any suitable combination of hardware, firmware, and software.

Mobile device 102 includes geographic database 122, which stores geographic data 124. A portion or all of geographic data 124 may be a subset of geographic data 126 stored in geographic database 106. Where appropriate, and as described in greater detail below, mobile device 102 retrieves a portion of geographic data 126 from geographic database 106 and stores the retrieved portion in geographic database 122 as geographic data 124. Example details of geographic data 126 are described below. The below description of geographic data 126 may apply equally to geographic data 124.

Geographic database 106 stores geographic data 126, which may be used, either alone or as a supplement to a wireless-based mobile device positioning system (e.g., the GNSS system), to determine a geographic location of mobile device 102. Geographic data 126 may also be referred to as map data. A particular example set of geographic data 126 is described below with reference to FIG. 3.

Geographic data 126 includes identifiers of geographic locations, along with one or more properties associated with each of those geographic locations. In certain embodiments, an identifier of a geographic location stored in geographic data 126 is a particular way of uniquely identifying a particular location of an object (e.g., mobile device 102). As one particular example, a geographic location may be a latitude and longitude. Although this disclosure primarily describes the geographic location as a latitude and longitude, this disclosure contemplates representing geographic location in other suitable ways.

Each geographic location in geographic data 126 may be associated with one or more properties, which may be stored as part of geographic data 126. The one or more properties may include any suitable objects, events, conditions, or other information that can be associated with particular geographic locations. For example, the one or more properties may include road information (e.g., nodes, edges, street names, addresses, and the like). The one or more properties include at least some information that can be measured using one or more sensors 120. In certain embodiments, the properties associated with a geographic location include one or more of the following: a node identifier (ID), a road, a street address, a road heading, an altitude/elevation, a local magnetic field pattern, a light intensity, a three-dimensional point cloud geographic position, and any other suitable properties.

As can be seen, at least some of these properties are measurable values of various types. For example, a road heading is a measureable value of a first type that may be stored for a particular geographic location in geographic data 126. As another example, an altitude is a measureable value of a second type that may be stored for a particular geographic location in geographic data 126. As another example, a local magnetic field event is a measureable value of a third type that may be stored for a particular geographic location in geographic data 126. As another example, a light intensity is a measureable value of a fourth type that may be stored for a particular geographic location in geographic data 126. As another example, a three-dimensional point cloud geographic position is a measureable value of a fifth type that may be stored for a particular geographic location in geographic data 126. A particular geographic location may be associated with one or more of these and/or other measurable values of particular types. Although this disclosure describes particular properties for a geographic location, this disclosure contemplates any suitable number and type of properties being associated with a geographic location.

Geographic data 126 may store geographic locations and their associated properties in such a way that geographic locations and their associated properties are mapped to one another. For example, geographic locations in geographic data 126 may be stored in such a way that the corresponding properties for a geographic location can be used to identify the geographic location. For a particular type of measureable value, multiple geographic locations may each have the same measureable value. As a particular example, if a series of geographic locations are along a generally straight road segment, multiple geographic locations along that road segment may all have the same associated road heading. On the other hand, if a series of geographic locations are along a generally curved road segment, the series of geographic locations along that road segment may each have a unique road heading.

Although this disclosure contemplates geographic data 126 including particular types of data, this disclosure contemplates geographic data 126 including a portion of the described data, additional data, and/or different data, according to particular implementations.

Geographic data 126 may be collected and assembled over time, based on log files from mobile devices 102 for example. For example, an entity managing geographical data 126 may deploy one or more mobile devices 102 to collect and report data from sensors 120 at various geographic locations, each reporting log files that include sensor measurements at particular geographic locations encountered by the mobile device 102. As another example, geographic data 126 may be crowd-sourced from numerous mobile devices 102, each reporting log files that include sensor measurements at particular geographic locations encountered by the mobile device 102. The log files may be processed by the entity in any suitable manner to develop the version of geographical data 126 that is published for use by mobile devices 102. Furthermore, geographic data 126 may be updated, as appropriate.

Returning to mobile device 102, geographic data 124 in geographic database 122 may be a portion or all of geographic data 126 from geographic database 106. Geographic data 124 in geographic database 122 of mobile device 102 may have a similar content and structure to geographic data 126 of geographic database 106. In certain embodiments, geographic data 124 in geographic database 122 is only a portion of geographic data 126 from geographic database 106. For example, as mobile device 102 moves from location to location, mobile device 102 (e.g., location determination logic 138 of mobile device 102) may retrieve a portion of geographic data 126 that is relevant to a current approximate geographic location of mobile device 102 (or an area being searched using an application of mobile device 102). As a more particular example, mobile device 102 (e.g., location determination logic 138 of mobile device 102) may retrieve a portion of geographic data 126 that is associated with geographic locations that are within a predetermined distance of the current approximate geographic location of mobile device 102 (or that are within an area being searched using an application of mobile device 102).

Furthermore, geographic data 124 may include a portion or all of the properties for each geographic location that are available in geographic data 126. For example, depending on the particular use of geographic data 124 performed by mobile device 102, mobile device 102 may retrieve only a portion of the properties for each retrieved location that are available in geographic data 126.

As mobile device 102 moves locations, mobile device 102 may replace and/or add to geographic data 124 using geographic data 126, as appropriate, which may help control the amount of storage space on mobile device 102 used to store geographic data 124. Additionally or alternatively, mobile device 102 may permanently store a portion or all of the geographic data 126 stored in geographic database 122 (as geographic data 124). Additionally or alternatively, a portion or all of geographic data 124 may be stored at geographic database 106 as geographic data 126, and mobile device 102 may access geographic data 126 via network 108.

Geographic databases 106 and 122 store, either permanently or temporarily, data (including geographic data 124 and 126, respectively), operational instructions (e.g., software), or other information for access and/or execution by processor 110. Geographic databases 106 and 122 include any one or a combination of volatile or non-volatile local or remote devices for storing information. For example, memory 112 may include static or dynamic RAM, ROM, magnetic storage devices, optical storage devices, hard disks, SIM cards, memory sticks, SD memory cards, or any other information storage device or a combination of these devices. In certain embodiments, at least a portion of geographic databases 106 and 122 is non-transitory.

To the extent geographic databases 106 and 122 are implemented as databases, geographic databases 106 and 122 may each be implemented as any suitable type of database. For example, each of geographic databases 106 and 122 may be implemented as a relational or non-relational database. As particular examples, one or both of geographic databases 106 and 122 may be a structured query language (SQL) database, a relational database management systems (RDBMS) database, or a NoSQL database. One or both of geographic databases 106 and 122 may be distributed databases, if appropriate.

Although illustrated as single entities, geographic databases 106 and 122 may be distributed across any suitable numbers and types of storage modules. Furthermore, although geographic database 122 of mobile device 102 is illustrated separately from memory 112 of mobile device 102, this disclosure contemplates memory 112 and geographic database 122 being combined in any suitable manner.

Mobile device 102 may communicate with geographic database 106 via network 108. Network 108 facilitates wireless or wireline communication. Network 108 may communicate, for example, Internet protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), mobile networks (e.g., using BLUETOOTH, WiMax (802.16), Wi-Fi (802.11), 3G, 4G, 5G, Long-Term Evolution (LTE), 5G New Radio (NR), or any other suitable wireless technologies in any suitable combination), all or a portion of the global computer network known as the Internet, and/or any other communication system or systems at one or more locations, any of which may be any suitable combination of wireless and wireline. Components of system 100 (e.g., mobile device 102 and geographic database 106) may communicate with network 108 via one or more links 128, which may facilitate any suitable type of wireless or wireline communication, alone or in combination. In certain embodiments, links 128 are part of network 108.

Mobile device 102 may connect to network 108 via one or more access points 130. Example access points 130 include a cellular base station 132 (e.g., an eNB), a Wi-Fi access point 134, a BLUETOOTH device 136, or any other suitable type of access element for connecting to network 108.

In certain embodiments, access points 130 provide an ability to determine a geographic location of mobile device 102. For example, these access points 130 may rely on any suitable combination of knowledge of locations of access points 130, signal strengths of signals received by mobile device 102 (from access points 130) or access points 130 (e.g., from mobile device 102), or any other suitable information to facilitate determining a geographic location of mobile device 102. At least some of access points 130 may connect wirelessly to mobile device 102 (e.g., link 128a being a wireless link in such scenarios). In this way, access points may be additional examples of a wireless-based mobile device positioning system. Thus, a wireless-based mobile device positioning system may include any system that connects wirelessly to mobile device 102 and that facilitates determining a geographic location of mobile device 102 based at least in part on the ability of the system to connect wirelessly to mobile device 102.

In embodiments in which link 128a is a wireless link, the ability of access points 130 to facilitate determining a geographic location of mobile device 102 may depend, at least in part, on an ability of mobile device 102 to connect wirelessly to access points 130. Similar to the above-described GNSS system (another example of a wireless-based mobile device positioning system), if mobile device 102 loses an ability to connect wirelessly to access point 130 or experiences a degraded connecting to such access points 130 (e.g., by entering a tunnel), the access point 130 may experience difficulty in facilitating determining a geographic location of mobile device 102.

Returning to mobile device 102, mobile device 102 includes location determination logic 138, which may be implemented using any suitable combination of hardware, firmware, and software. In general, location determination logic 138 is configured to determine a geographic location of mobile device 102 using input from one or more sensors 120, GNSS receiver 116 (and/or another suitable wireless-based mobile device positioning system), and geographic data 124 from geographic database 122. The remainder of this description focuses primarily on embodiments in which the wireless-based mobile device positioning system is a GNSS system (e.g., using satellites 104 and GNSS receiver 116); however, it will be understood that this disclosure contemplates using any suitable type of wireless-based mobile device positioning systems, alone or in combination, to determine a geographic location of mobile device 102.

Location determination logic 138 may receive a geographic location of mobile device 102 from GNSS receiver 116. Additionally or alternatively, location determination logic 138 may receive wireless signals 118 (or signals or information derived from wireless signals 118) that GNSS receiver 116 received and determine a geographic location of mobile device 102 based on the received wireless signals 118. Whether location determination logic 138 receives the geographic location from GNSS receiver 116 or determines the geographic location itself, in certain embodiments, location determination logic 138 may perform additional processing of the geographic location determined based on wireless signals 118. This additional processing may include filtering (e.g., using a Kalman filter), dead reckoning, and/or other types of processing, which may be used to further refine or confirm the geographic location determined from wireless signals 118.

Although geographic locations determined using wireless signals 118 may generally be sufficient (e.g., accurate enough) for many applications, due to the presence of obstructions or other interference, from time to time wireless signals 118 may become inaccessible to mobile device 102 or may be of such a degraded quality that wireless signals 118 do not provide an accurate enough indication of geographic location. For example, mobile device 102 may enter a tunnel, which may reduce or eliminate that ability of GNSS receiver 116 to receive wireless signals 118. As another example, mobile device 102 may be located in a relatively low-lying area among numerous tall buildings (e.g., in a so-called urban canyon), which may reduce or eliminate the ability of GNSS receiver 116 to receive wireless signals 118. As another example, mobile device 102 may be located in an area among dense tree cover, which may reduce or eliminate the ability of GNSS receiver 116 to receive wireless signals 118. Although particular causes of inaccessible or degraded signals are described, this disclosure contemplates wireless signals 118 becoming inaccessible or degraded for any suitable reason. Embodiments of the present disclosure provide additional and/or alternative mechanisms for determining the geographic location of mobile device 102.

In certain embodiments, location determination logic 138 determines whether or not a geographic location determined using wireless signals 118 is reliable. For example, location determination logic 138 may determine whether GNSS receiver 116 is able to receive wireless signals 118. As particular examples, location determination logic 138 may simply not receive a geographic location from GNSS receiver 116 (e.g., in an embodiment in which GNSS receiver 116 itself determines the geographic location based on wireless signals 118), may not receive wireless signals 118 (or signals or information derived from wireless signals 118) from GNSS receiver 116 (e.g., in an embodiment in which GNSS receiver 116 sends wireless signals 118, or signals or information derived from wireless signals 118, for geographic location determination), or may otherwise determine whether GNSS receiver 116 is able to receive wireless signals 118. As another example, even though GNSS receiver 116 is able to receive wireless signals 118, location determination logic 138 may determine that a geographic location determined from those wireless signals 118 is unreliable. As a particular example, location determination logic 138 may determine that a sufficiently accurate geographic location cannot be determined from the received wireless signals 118, due to the received wireless signals 118 being of degraded quality (e.g., due to interference) or for some other reason. As an example, location determination logic 138 may determine that a geographic location determined from received wireless signals 118 is unreliable by determining that one or more parameters associated with the determined geographic location is below a predetermined threshold. If location determination logic 138 determines that GNSS receiver 116 is unable to receive wireless signals 118 or that a geographic location determined from received wireless signals 118 is not sufficiently accurate, then location determination logic 138 may determine that a geographic location determined using wireless signals 118 is unreliable.

Indicators of the quality of GNSS signals (e.g., wireless signals 118) received by wireless device 102, which in turn may indicate how reliable a geographic location determined from those GNSS signals is (if a geographic location can even be determined from the received GNSS signals) include signal strength, signal to noise ratio, residuals (which may provide an indication of inconsistent measurements among GNSS signals received from different satellites 104), and any other suitable indicators. In certain embodiments, parameters for determining whether or not a geographic location determined from wireless signals 118 may include any one of these or other indicators, and a predetermined threshold may establish a value for one or more of these indicators. Location determination logic 138 may determine that a geographic location determined from received wireless signals 118 is unreliable by determining that one or more parameters associated with the determined geographic location is below a predetermined threshold for these or other indicators.

As an example scenario, mobile device 102 may be moving along a road with open sky available, and location determination logic 138 may determine that geographic locations determined from wireless signals 118 (e.g., either from a geographic location provided by GNSS receiver 116 or determined by location determination logic 138 from information received from GNSS receiver 116) are reliable. This may result in mobile device 102 having a series for reliable geographic locations, updated at a suitable interval, as mobile device 102 moves along the road. Mobile device 102 may then enter a tunnel, resulting in GNSS receiver 116 losing the ability to receive wireless signals 118. On the next attempt to update the geographic location of mobile device 102 (after entering the tunnel and GNSS receiver 116 losing the ability to receive wireless signals 118), location determination logic 138 may determine that a next geographic location determined using the GNSS system (e.g., GNSS receiver 116 and satellites 104) is unreliable (in this case, that it is unavailable).

As another example scenario, mobile device 102 may be moving along a road with open sky available, and location determination logic 138 may determine that geographic locations determined from wireless signals 118 (e.g., either from a geographic location provided by GNSS receiver 116 or determined by location determination logic 138 from information received from GNSS receiver 116) are reliable. This may result in mobile device 102 having a series for reliable geographic locations, updated at a suitable interval, as mobile device 102 moves along the road. Mobile device 102 may then enter an area with dense tree cover, resulting, in this particular example, in GNSS receiver 116 receiving degraded wireless signals 118. On the next attempt to update the geographic location of mobile device 102 (after entering the urban canyon and GNSS receiver 116 receiving degraded wireless signals 118), location determination logic 138 may determine that a next geographic location determined using the GNSS system (e.g., GNSS receiver 116 and satellites 104) is unreliable.

Location determination logic 138 may access data from sensors 120 and geographic data 124 from geographic database 122 to determine a geographic location of mobile device 102. For example, even though location determination logic 138 determines that updating the geographic locations using the GNSS system is unreliable, location determination logic 138 updates the last determined geographic location using data from sensors 120 and geographic data 124 from geographic database 122. The geographic location determined by location determination logic 138 using data from sensors 120 and geographic data 124 from geographic database 122 may be used to correct an error in a previously determined geographic location (e.g., one determined based on wireless signals 118), confirm a previously determined geographic location (e.g., one determined based on wireless signals 118), or replace a missing geographic location (e.g., where GNSS receiver 116 is unable to receive wireless signals 118 to update a previously determined geographic location). Although this disclosure primarily describes location determination logic 138 determining a geographic location of mobile device 102 using data from sensors 120 and geographic data 124 from geographic database 122 when determining a geographic location of mobile device 102 using the GNSS system is unreliable, this disclosure contemplates location determination logic 138 using data from sensors 120 and geographic database 122 to confirm a geographic location determined by another system (e.g., GNSS system).

Location determination logic 138 may access data from sensors 120 and compare the data to geographic data 124 to determine a location of mobile device 102. For example, location determination logic 138 may access a particular value of a first type determined according to a measurement of a first sensor 120a, access geographic data 124 in geographic database 122 (which includes a mapping between measurable values of the first type and particular geographic locations), and determine a geographic location of mobile device based on the access information.

In certain embodiment, a benefit of using data from sensors 120 (e.g., an IMU) on mobile device 102 is that those sensors 120 generally are available (assuming the sensors 120 can be powered), and do not rely on communication with components distinct from mobile device 102, in contrast to wireless-based mobile device positioning systems. Thus, the measurements obtained by sensors 120 are generally available to facilitate a determination/refinement of geographic location determination.

In general, location determination logic 138 accesses measurements of sensors 120 and compares information determined from those measurements (which could be the measurements themselves or information determined by performing some additional processing of the measurements of sensors 120) to geographic data 124. Geographic data 124 includes, for various geographic locations, values for properties that correspond to the types of information determined from sensors 120. Thus, based on the information determined from the measurements of sensors 120, location determination logic 138 attempts to determine a geographic location that most closely matches that information. This determined geographic location may be used to update a previously-determined geographic location (e.g., the last geographic location determined using the wireless-based mobile device positioning system that was determined to be reliable or any other previously-determined geographic location) or for other purposes, as described above.

In certain embodiments, location determination logic 138 may use the measurements of sensors 120 collectively to determine a geographic location of mobile device 102, such as by comparing data from each of sensors 120 (or a particular subset of sensors 120) to geographic data 124 and using the results of that collective comparison to determine the geographic location of mobile device 102. In certain embodiments, location determination logic 138 may evaluate the measurements of sensors 120 in a particular order, such that if location determination logic 138 is able to determine a unique geographic location of mobile device 102 based on the output of a first sensor 120, location determination logic 138 does not evaluate the measurements of the additional sensors 120 (for purposes of determining a geographic location of mobile device 102 during the current iteration of location determination). As a particular example, location determination logic 138 may first attempt to determine the geographic location of mobile device 102 based on a heading of mobile device 102 determined using a gyroscope, and then, if location determination logic is unable to determine a unique geographic location based on the heading, attempt to determine the geographic location of mobile device 102 based on an altitude of mobile device 102 determined using an altitude sensor. Location determination logic 138 may continue this process using information determined from measurements of the remaining sensors 120 (and for which associated mappings are stored in geographic data 124) until location determination logic 138 is able to determine a unique geographic location of mobile device 102 or until location determination logic 138 determines that it is unable to determine a unique geographic location of mobile device 102 using information determined from measurements of the sensors 120 (and for which associated mappings are stored in geographic data 124).

Although this disclosure focuses on scenarios in which the wireless-based mobile device positioning system (e.g., the GNSS) is determined to be unreliable, it should be understood that location determination logic 138 may use the measurements from sensors 120 and comparisons to geographic data 124 even when the wireless-based mobile device positioning system remains reliable. For example, location determination logic 138 may use the measurements from sensors 120 and comparisons to geographic data 124 to confirm a geographic location determined using the wireless-based mobile device positioning system, to provide additional detail for a geographic location determined using the wireless-based mobile device positioning system, or for any other suitable purpose. As just one particular example of providing additional detail for a geographic location determined using the wireless-based mobile device positioning system, location determination logic 138 may use the measurements from an altimeter and comparisons to geographic data 124 to determine on which of two stacked roads the mobile device 102 is located. A detailed example of this scenario is described below with reference to FIG. 10.

Figure 2:
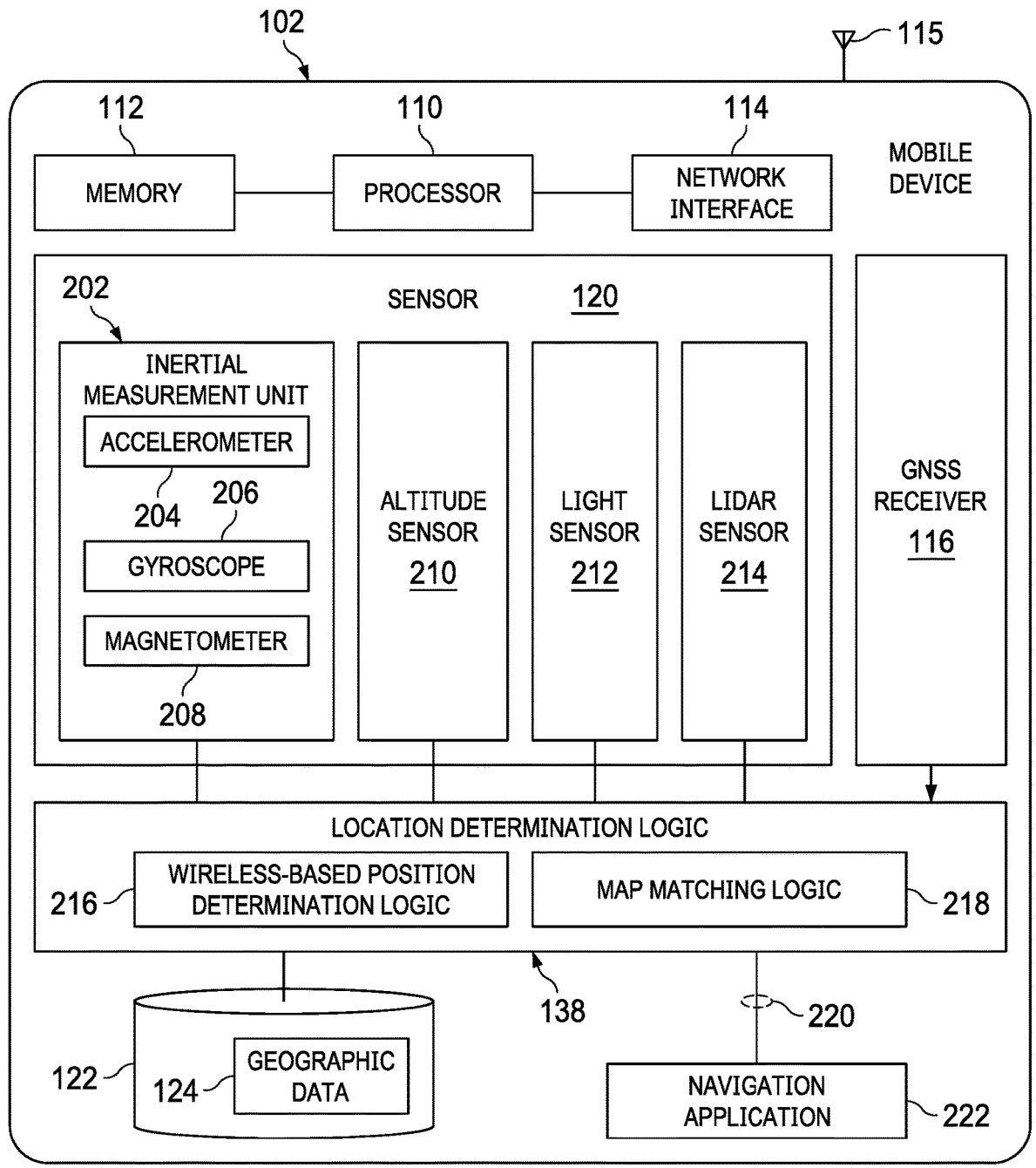
FIG. 2 illustrates an example mobile device, according to certain embodiments of the present disclosure.

FIG. 2 illustrates an example mobile device 102, according to certain embodiments of the present disclosure. For purposes of this example, mobile device 102 as shown in FIG. 2 includes many of the same or similar components to those illustrated in mobile device 102 in FIG. 1. Thus, details of those components of mobile device 102 are not repeated in the description of FIG. 2.

In the example of FIG. 2, sensors 120 from FIG. 1 have been replaced with particular example sensors. Thus, as shown in FIG. 2, mobile device 102 includes an inertial measurement unit 202 (that includes an accelerometer 204, a gyroscope 206, and a magnetometer 208), an altitude sensor 210, a light sensor 212, and a LiDAR sensor 214. Although this particular combination of sensors 120 is described, this disclosure contemplates sensors 120 of mobile device 102 including some or all of these sensors, as well as other sensors, as appropriate.

In the example of FIG. 2, location determination logic 138 includes wireless-based position determination logic 216 and map matching logic 218. Although location determination logic 138 is illustrated and described as including particular elements, this disclosure contemplates location determination logic 138 including any suitable elements. Furthermore, although the elements of location determination logic 138 are described as performing particular operations, this disclosure contemplates other elements performing those operations.

Wireless-based mobile device position determination logic 216 may attempt to determine a geographic location of mobile device 102 using a wireless-based mobile device positioning system. For example, wireless-based mobile device determination logic 216 may attempt to determination a geographic location of mobile device 102 using the GNSS system (e.g., based on wireless signals 118 received by GNSS receiver 116 of mobile device 102 from one or more satellites 104). As another example, wireless-based mobile device determination logic 216 may attempt to determination a geographic location of mobile device 102 using one or more access points 130 (e.g., based on communication via network interfaces 114 with one or more access points 130). In certain embodiments, wireless-based mobile device position determination logic 216 may receive the geographic location from the wireless-based mobile device positioning system (e.g., from GNSS receiver 116). Additionally or alternatively, wireless-based mobile device position determination logic 216 may receive signals from the wireless-based mobile device positioning system (e.g., from GNSS receiver 116) and may determine the geographic location of mobile device 102 from those signals.

Wireless-based position determination logic 216 also may be configured to determine the availability of the wireless-based mobile device positioning system and may determine a reliability of a geographic location determined using the wireless-based mobile device positioning system.

Map matching logic 218 is configured to adjust a geographic location determined using wireless-based position determination logic 216 to determine an updated geographic location. For example, the geographic location determined using wireless-based position determination logic 216 may be a current geographic location of mobile device 102, in which case the updated geographic location may be considered a refinement to the geographic location determined using wireless-based position determination logic 216 (and thereby correct an error in the geographic location determined using wireless-based position determination logic 216). As another example, the geographic location determined using wireless-based position determination logic 216 may be a last known geographic location of mobile device 102 (prior to wireless-based position determination logic 216 determining that the wireless-based mobile device positioning system is no longer reliable), in which case the updated geographic location may be considered a current geographic location of mobile device 102 (e.g., a next geographic location subsequent to the last known geographic location).

Embodiments of this disclosure may be implemented by map matching logic 218. For example, map matching logic 218 may be configured to access data from sensors 120 and compare the data from sensors 120 (of values calculated from the data output from sensors 120) to geographic data 124 to determine a geographic location of mobile device 102.

In certain embodiments, location determination logic 138 provides the determined geographic location of mobile device 102 as geographic location 220 to one or more other systems. For example, location determination logic 138 may provide geographic location 220 to one or more other systems on mobile device 102. As another example, location determination logic 138 may provide geographic location 220 to one or more other systems distinct from mobile device 102.

In the illustrated example, mobile device 102 includes navigation application 222, which may be implemented using any suitable combination of hardware, firmware, and software. Navigation application 222 may be configured to provide navigation instructions to a user of mobile device 102. For example, navigation application 222 may provide route instructions for a user of mobile device 102 from a source to a destination, updated as the user traverses the route. Navigation application 222 may access geographic location 220 provided by location determination logic 138 to facilitate providing updated route instructions to a user of mobile device 102.

FIG. 3 is a table 300 illustrating example geographic data 126 of geographic database 106, according to certain embodiments of the present disclosure. Geographic data 124 of geographic database 122 could also take a similar form. Although shown in tabular form, this disclosure contemplates geographic data 126 being organized in any suitable manner.

In the illustrated example, column 302 includes geographic locations (such that each row of rows 318 of table 300 corresponds to a geographic location), and each subsequent column (columns 304-316) of table 300 specify values for properties of those geographic locations. In the illustrated example, column 304 includes a nodeID, column 308 includes a road heading (e.g., in degrees), column 310 includes an altitude (e.g., in meters), column 312 includes a local magnetic field (e.g., in microtesla), column 314 includes a light intensity (e.g., in LUX), and column 316 includes a three-dimensional point cloud geographic position (as determined from LiDAR sensor data) (e.g., as a three-dimensional local model).

As shown, table 300 maps particular measurable values of various types (e.g., types corresponding to the properties of each of columns 304-316 in this example) to particular geographic locations (e.g., of column 302). Table 300 could be sorted in other ways to map particular geographic locations to measurable values of certain types.

The information included in geographic data 126 shown in FIG. 3 is provided for example purposes only. This disclosure contemplates geographic data 126 taking any suitable form and including any suitable information, according to particular implementations. For example, geographic data 126 could include some or all of the information shown in FIG. 3. As another example, geographic data 126 could include different information from the information shown in FIG. 3.

Figure 4:
FIG. 4 illustrates an example of errors that may result from relying on a global navigation satellite system (GNSS) and position propagation using an inertial measurement unit (IMU), according to certain embodiments of the present disclosure.

FIG. 4 illustrates an example of errors that may result from relying on GNSS system and position propagation using an IMU, according to certain embodiments of the present disclosure. For purposes of describing the example in FIG. 4, the GNSS system and position propagation using an inertial measurement sensor combination will be referred to as the GNSS+IMU system.

The actual path of a mobile device in this example is shown by the shaded route. For clarity, the direction of travel is shown by arrows 402. The determined geographic location reported by the GNSS+IMU system is shown by line 404, which is broken into segments 404a, 404b, 404c, and 404d. The actual path of mobile device 102 encounters two tunnels, with the entrances and exits of the tunnels marked in FIG. 4 (Tunnel #1 Entrance, Tunnel #1 Exit, Tunnel #2 Entrance, and Tunnel #2 Exit).

As can be seen from line segment 404a and the beginning of line segment 404b (prior to Tunnel #1 Entrance), the geographic location determined by the GNSS+IMU system is generally accurate. After the mobile device enter Tunnel #1 at Tunnel #1 Entrance, the geographic location determined by the GNSS+IMU system almost immediately begins to stray from the actual path of the mobile device, as shown by line segment 404b, ultimately resulting in a large overshoot when the mobile device exits Tunnel #1 at Tunnel #1 Exit. Additionally, while the geographic location determined by the GNSS+IMU system recovers after the mobile device exits Tunnel #1, the mobile device may begin determining and providing incorrect navigation instructions while the mobile device is in Tunnel #1 and as the mobile device exits Tunnel #1 (as there will be a delay before the GNSS+IMU system can recover). This can be frustrating for a user of mobile device 102 who is relying on mobile device 102 to provide accurate and timely navigation instructions.

Once the GNSS+IMU system recovers, line segment 404c shows that the geographic location determined by the GNSS+IMU system again becomes generally accurate until the mobile device enters Tunnel #2 at Tunnel #2 Entrance. While the geographic locations determined by the GNSS+IMU system remain closer to the road of the actual path for Tunnel #2, as can be seen at the end of line segment 404c and the beginning of line segment 404d, the geographic location determined by the GNSS+IMU system shows the mobile device to be far behind the actual location of the mobile device when the mobile device exits Tunnel #2 at Tunnel #2 Exit.

Figure 5:
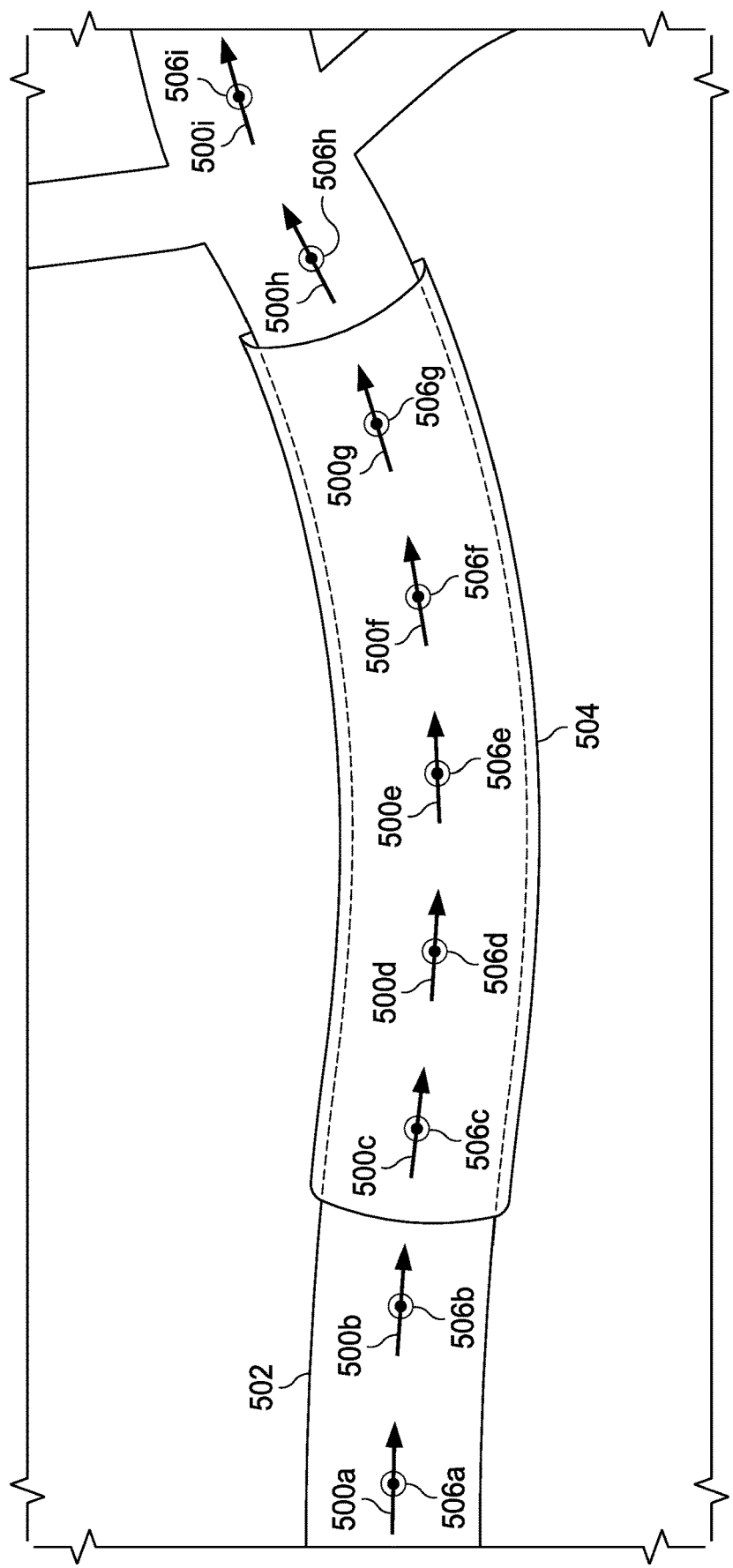
FIG. 5 illustrates example road headings for a road that includes a segment that passes under a tunnel, according to certain embodiments of the present disclosure.

FIG. 5 illustrates example road headings 500 for a road 502 that includes a segment that passes under a tunnel 504, according to certain embodiments of the present disclosure. FIG. 5 provides merely one example of a road and of road headings for a road.

As shown, road 502 passes under tunnel 504 and generally has a curved shape. The arrows along road 502 reflect road headings 500, or the direction of travel. Although road headings 500 are shown to have a particular spacing, this disclosure contemplates road headings having more or less frequent spacing.

In this example, each road heading 500 is shown to correspond to a particular geographic location 506. For example, road heading 500a corresponds to geographic location 506a, road heading 500b corresponds to geographic location 506b, road heading 500c corresponds to geographic location 506c, road heading 500d corresponds to geographic location 506d, and so on. In certain embodiments of the present disclosure, for each geographic location 506, geographic data 126 in geographic database 106 (and geographic data 124 in geographic database 122, if appropriate) reflect this correspondence such that the road heading 500 for the geographic location 506 is identified in geographic data 126/124.

Furthermore, in the illustrated example, each geographic location 506 has a relatively unique road heading 500. This is largely due to the curved nature of road 502.

Figure 6:
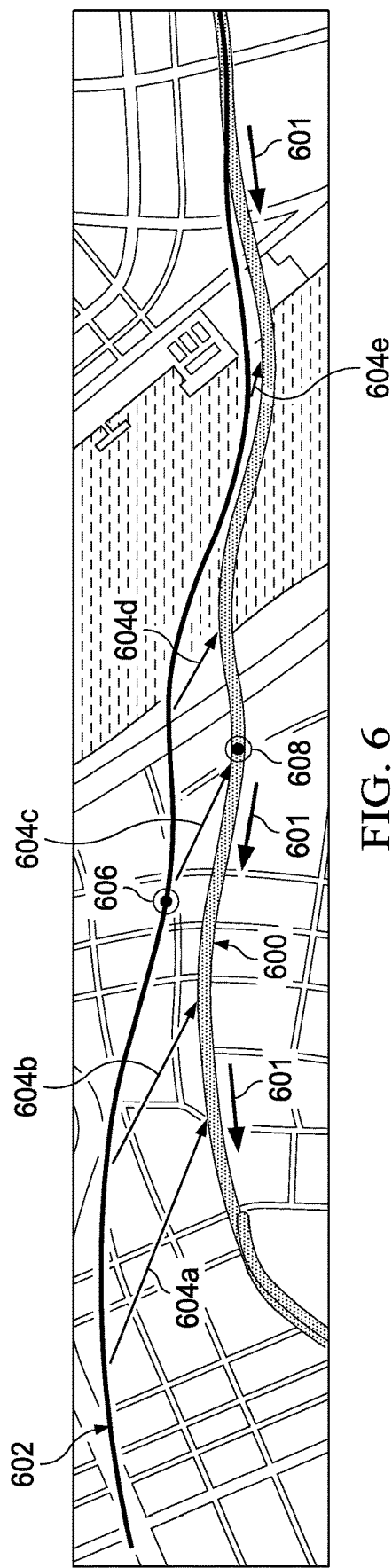
FIG. 6 illustrates an example of using road headings to correct geographic location errors, according to certain embodiments of the present disclosure.

FIG. 6 illustrates an example of using road headings to correct geographic location errors, according to certain embodiments of the present disclosure.

The actual path of a mobile device in this example is shown at path 600. For clarity, the direction of travel is shown by arrows 601. The determined geographic location reported by the GNSS+IMU system is shown by line 602. The actual path of mobile device 102 encounters a tunnel. As can be seen, after entry into the tunnel, the geographic location determined by the GNSS+IMU system almost immediately begins to stray from the actual path of the mobile device 102, resulting in a large overshoot of the actual path.

As described above, embodiments of this disclosure use data from one or more sensors 120 and based on that data and geographic data 124, determine a geographic location of a mobile device 102. As shown in FIG. 6, path 600 of the mobile device 102 is relatively continuously curved. Thus, each geographic location along the actual path 600 may be associated with a relatively unique road heading within a particular distance from that geographic location. In this example, the geographic data 124 for the area shown in FIG. 6 may reflect a mapping of the road headings to the geographic locations along path 600.

Location determination logic 138 of mobile device 102 may compare headings determined by IMU 202 of mobile device 102 to the geographic data 124 for the area shown in FIG. 6 to more accurately determine the geographic location of mobile device 102. As shown by arrows 604, the geographic location determined using the comparison of headings determined by IMU 202 of mobile device 102 to the geographic data 124 for the area shown in FIG. 6 not only brings the geographic location back to the road of path 600, but also brings the position back along path 600, correcting along track errors in addition to across track errors. As a particular example, arrow 604c shows that a geographic location 606 determined by a GNSS+IMU system may be more accurately determined as geographic location 608 using the comparison of headings determined by IMU 202 of mobile device 102 to the geographic data 124 for the area shown in FIG. 6, correcting both an across track error and an along track error.

To the extent multiple geographic locations along path 600 have road headings that match the road heading determined according to IMU 202, location determination logic 138 may determine which of the multiple geographic locations to select as the geographic location of mobile device 102 in any suitable manner. As a first example, location determination logic 138 may access data from other sensors 120 and compare that data to geographic data 124 to attempt to map values for other properties to the particular multiple locations to confirm which of the multiple geographic locations actually corresponds to the geographic location of mobile device 102. In one example scenario, while the multiple geographic locations may have the same road heading, one of these multiple geographic locations may be mapped to the same altitude that is provided by the altitude sensor of mobile device 102. As a second example, location determination logic 138 may determine that, from the multiple geographic locations, the best estimate of the actual geographic location of mobile device 102 is the geographic location that is closest to the last determined geographic location of mobile device 102 in the direction of travel of mobile device 102 (the direction of travel being determined, for example, based on measurements of IMU 202).

Figure 7:
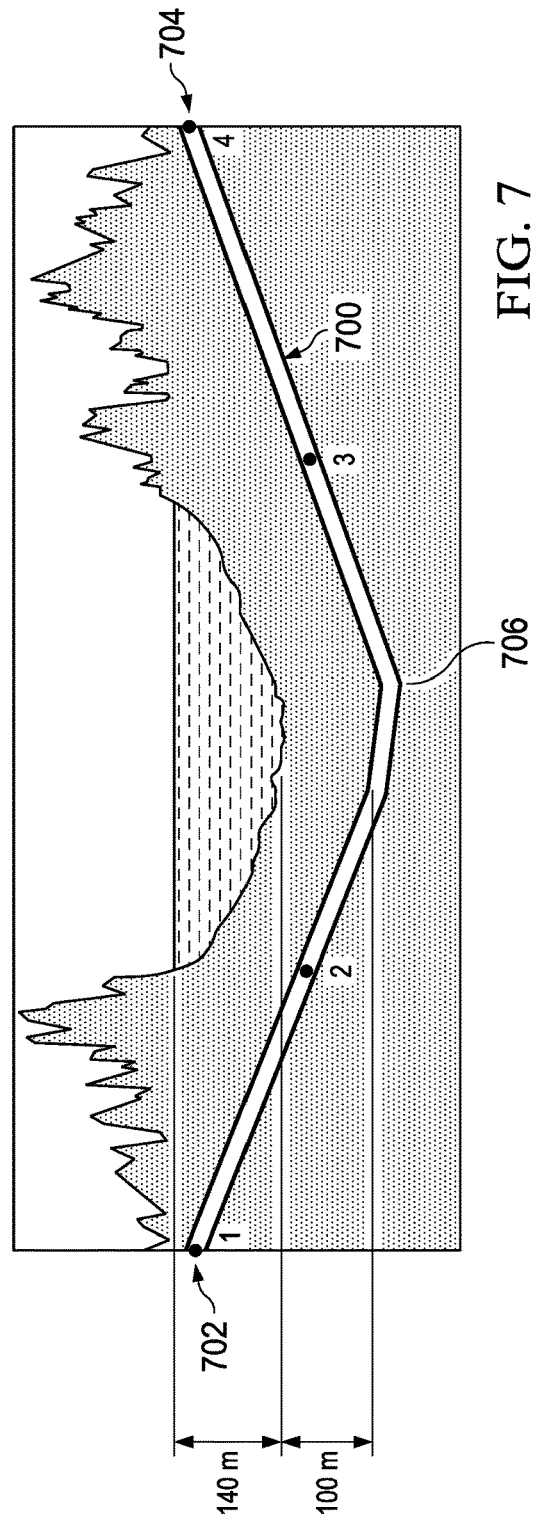
FIG. 7 illustrates an example roadway that has elevation changes and passes through a tunnel, according to certain embodiments of the present disclosure.

FIG. 7 illustrates an example roadway 700 that has elevation changes and passes through a tunnel, according to certain embodiments of the present disclosure. The tunnel shown in FIG. 7 includes tunnel entrance 702 and tunnel exit 704; however, whether 702 or 704 is considered the entrance or the exit depends on the direction of travel. Thus, for purposes of this example, it will be assumed that a mobile device 102 moves along roadway 700 and passes through the tunnel in a left-to-right direction.

Along this direction roadway 700 (in the tunnel) drops in elevation such that each geographic location along roadway 700 has a unique altitude (along the dropping portion) until the lowest point 706 of roadway 700 in the tunnel. After lowest point 706 and again along this same direction, roadway 700 (in the tunnel) rises in elevation such that each geographic location along roadway 700 has a unique altitude (along the rising portion) until tunnel exit 704.

For geographic locations along roadway 700, geographic data 124 may include an altitude for that geographic location. For example, geographic data 124 may include a first altitude value for location 1, a second altitude value for location 2, a third altitude value for location 3, and a fourth altitude value for location 4. Although a particular number of discrete geographic locations are shown (e.g., 1, 2, 3, and 4), this disclosure contemplates geographic data 124 storing properties for any suitable number of geographic locations of roadway 700. In certain embodiments, each of these altitude values may be unique such that location determination logic 138 of mobile device 102 can determine a particular geographic location of mobile device 102 according to a measurement of altitude sensor 210 of mobile device 102 and geographic data 124.

In certain scenarios, however, multiple geographic locations along roadway 700 and for which geographic data 124 stores associated properties may have approximately the same altitude value. For example, geographic locations 2 and 3 appear to be at essentially the same altitude such that an altitude value for geographic location 2 in geographic data 124 may be approximately equal to an altitude value for geographic location 3 in geographic data 124. To the extent multiple geographic locations along roadway 700 have altitudes that match the altitude determined according to altitude sensor 210, location determination logic 138 may determine which of the multiple geographic locations to select as the geographic location of mobile device 102 in any suitable manner. As a first example, location determination logic 138 may access data from other sensors 120 and compare that data to geographic data 124 to attempt to map values for other properties to the multiple geographic locations to confirm which of the multiple geographic locations actually corresponds to the geographic location of mobile device 102. In one example scenario, while the multiple geographic locations may have the same altitude, one of these multiple geographic locations may be mapped to the same road heading that is provided by the gyroscope 206 of mobile device 102. As a second example, location determination logic 138 may determine that, from the multiple geographic locations, the best estimate of the actual geographic location of mobile device 102 is the geographic location that is closest to the last determined geographic location of mobile device 102 in the direction of travel of mobile device 102 (the direction of travel being determined, for example, based on measurements of IMU 202).

Figure 8:
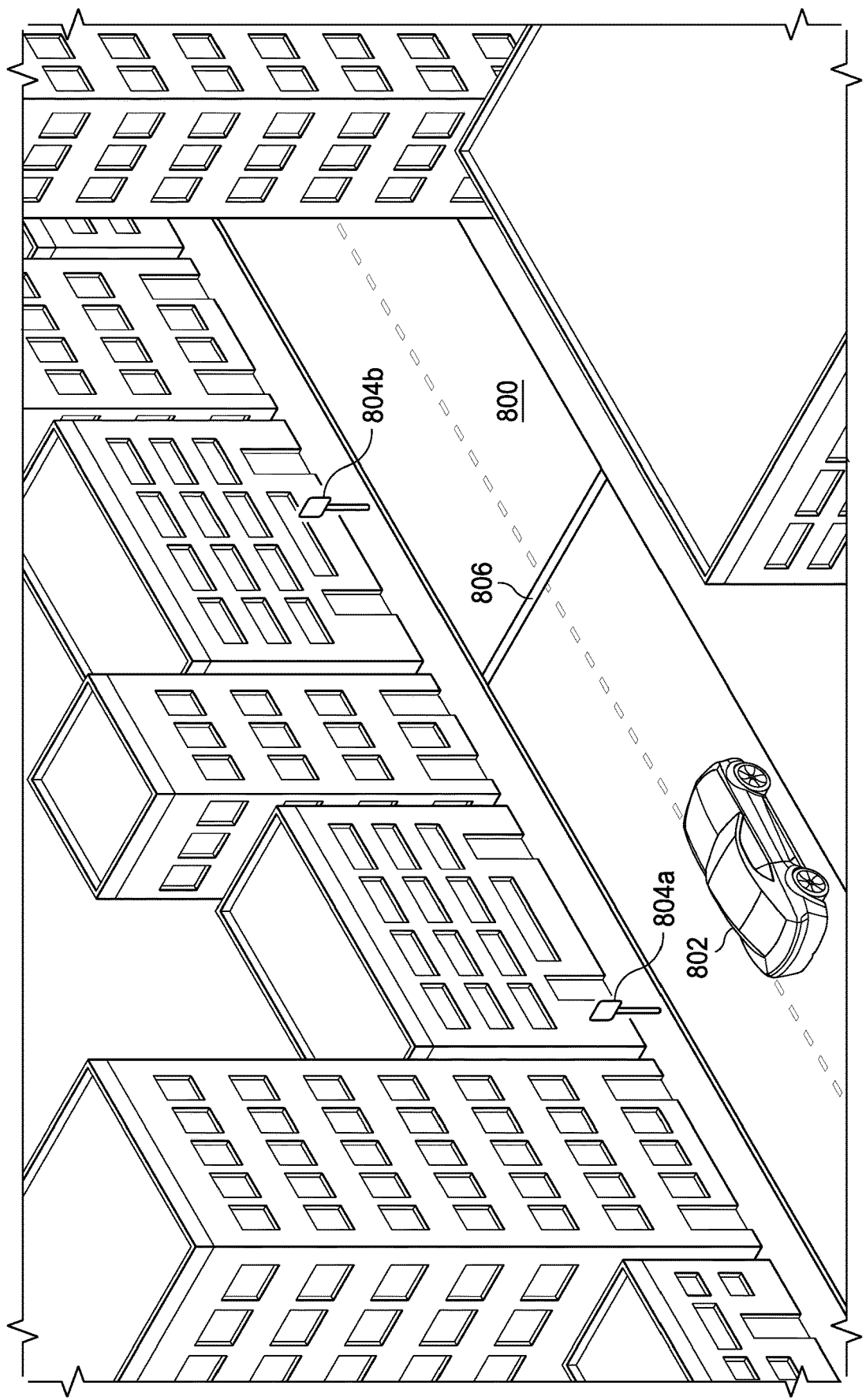
FIG. 8 illustrates example roadway along which one or more metal objects are positioned, according to certain embodiments of the present disclosure.

FIG. 8 illustrates example roadway 800 along which one or more metal objects are positioned, according to certain embodiments of the present disclosure. In the illustrated example, mobile device 102 is a vehicle 802. Additionally or alternatively, mobile device 102 is positioned inside vehicle 802. Vehicle 802 is located in an urban canyon, largely surrounded by tall buildings. In some scenarios, this urban canyon could obstruct the ability of location determination logic 138 to rely on a wireless-based mobile device positioning system to determine a geographic location of vehicle 802.

In the illustrated example, a number of metal objects are located on or near roadway 800. For example, metal signs 804 may be positioned on or near roadway 800 at various locations. As another example, metal strips 806 may be positioned on roadway 800 at various locations. These metal objects may be proximate geographic locations that are identified in geographic data 124. A property of those geographic locations in geographic data 124 may reflect the local magnetic field near those objects. For geographic locations along roadway 800, geographic data 124 may include a local magnetic field pattern for that geographic location.

A magnetometer 208 of vehicle 802 may measure a local magnetic field in proximity to vehicle 802 (e.g., within a detectable range of magnetometer 208). As vehicle 802 passes a metal object such as metal strip 806, the local magnetic field measured by magnetometer 208 may change, reflecting a local magnetic field event. Location determination logic 138 of vehicle 802 may compare a local magnetic field based on a measurement of magnetometer 208 of vehicle 802 to geographic data 124 and, to the extent the local magnetic field measured by magnetometer 808 corresponds to a local magnetic field in an area of vehicle 802, determination that a geographic location of vehicle 802 is the geographic location that corresponds to that local magnetic field.

Although metal objects are described, this disclosure contemplates any object that affects a local magnetic field in proximity to vehicle 802 (or another mobile device 102) being used as a basis for comparison to geographic data 124 for potential identification of a geographic location based on local magnetic field events.

Figure 9A:
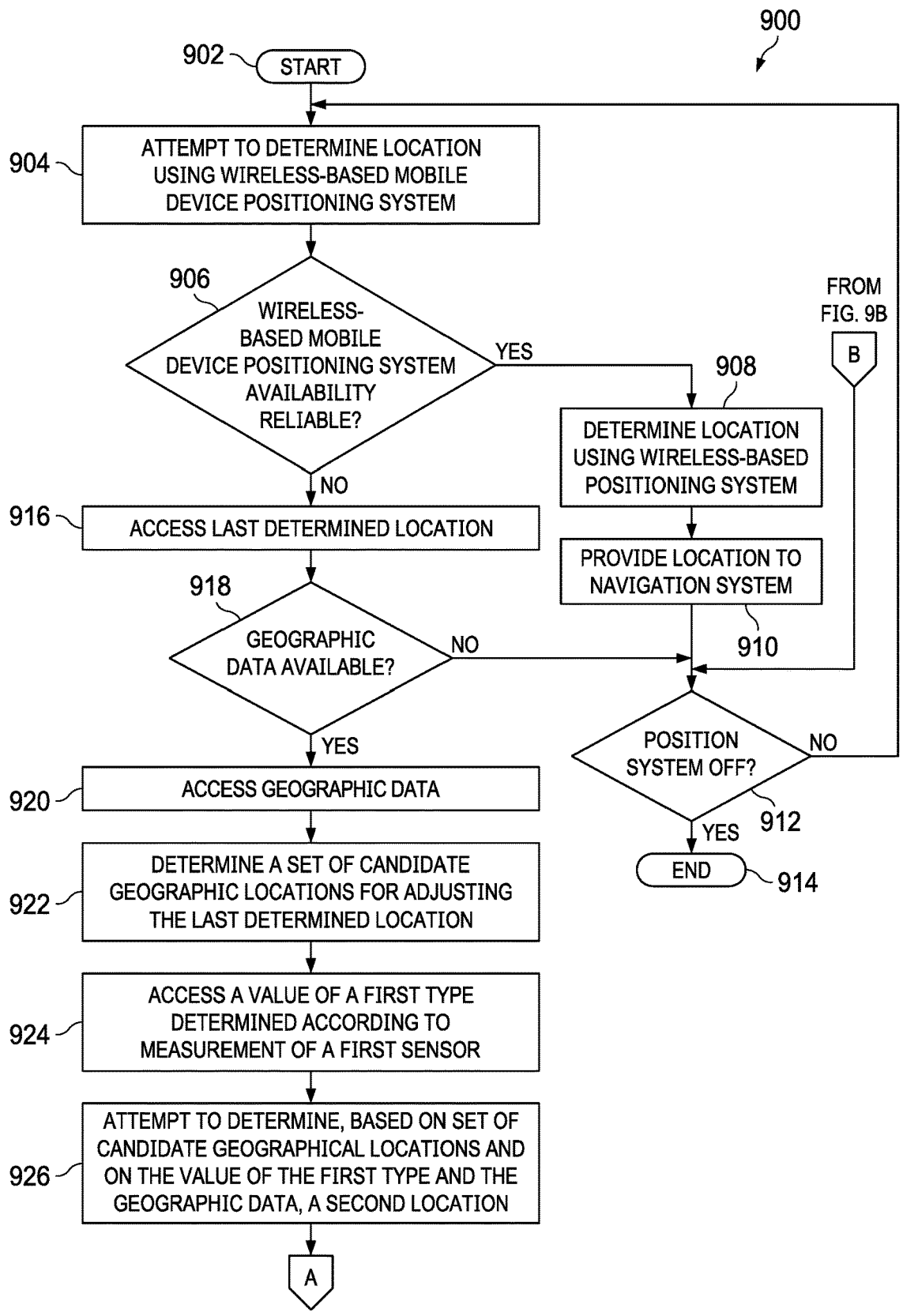
FIGS. 9A-9B illustrate an example method for determining a geographic location of a mobile device using sensor data, according to certain embodiments of the present disclosure.
Figure 9B:
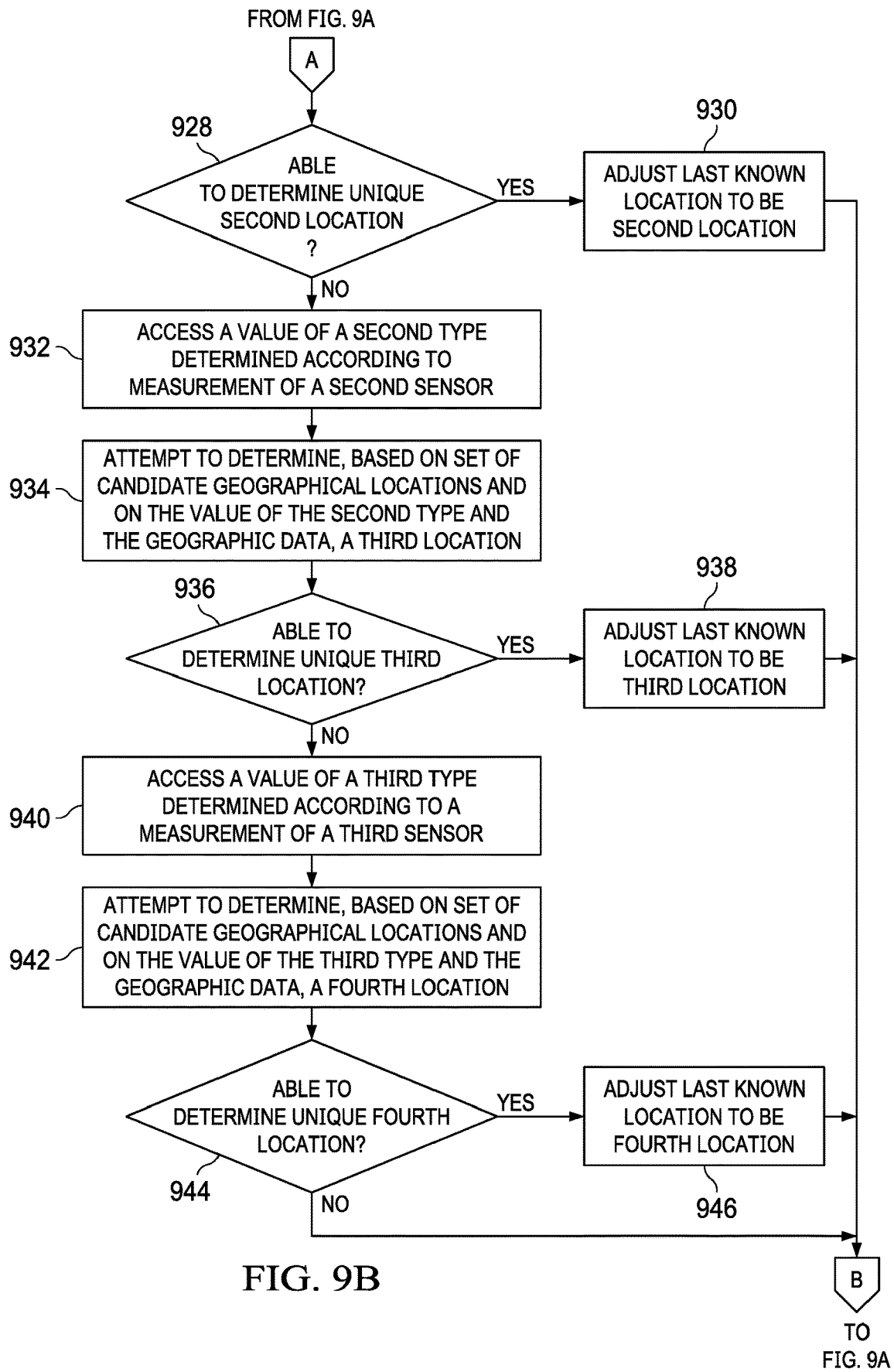

FIGS. 9A-9B illustrate an example method 900 for determining a geographic location of a mobile device 102 using sensor data, according to certain embodiments of the present disclosure.

The method begins at step 902. At step 904, location determination logic 138 attempts to determine a geographic location of mobile device 102 using a wireless-based mobile device positioning system. For example, location determination logic may attempt to determine a geographic location of mobile device 102 using a GNSS system (e.g., GNSS receiver receiving wireless signals 118 from one or more satellites 104).

At step 906, location determination logic 138 determines whether the wireless-based mobile device positioning system is reliable. For example, location determination logic 138 may determine whether GNSS receiver 116 is able to receive wireless signals 118 from satellites 104. As particular examples, location determination logic 138 may not receive a geographic location from GNSS receiver 116 (e.g., in an embodiment in which GNSS receiver 116 itself determines the geographic location based on wireless signals 118), may not receive wireless signals 118 (or signals or information derived from wireless signals 118) from GNSS receiver 116 (e.g., in an embodiment in which GNSS receiver 116 sends wireless signals 118, or signals or information derived from wireless signals 118, for geographic location determination), or may otherwise determine whether GNSS receiver 116 is able to receive wireless signals 118. As another example, even though GNSS receiver 116 is able to receive wireless signals 118, location determination logic 138 may determine that a geographic location determined from those wireless signals 118 is unreliable. As a particular example, location determination logic 138 may determine that a sufficiently accurate geographic location cannot be determined from the received wireless signals 118, due to the received wireless signals 118 being of degraded quality (e.g., due to interference) or for some other reason. As an example, location determination logic 138 may determine that a geographic location determined from received wireless signals 118 is unreliable by determining that one or more parameters associated with the determined geographic location is below a predetermined threshold. If location determination logic 138 determines that GNSS receiver 116 is unable to receive wireless signals 118 or that a geographic location determined from received wireless signals 118 is not sufficiently accurate, then location determination logic 138 may determine that a geographic location determined using wireless signals 118 is unreliable.

Indicators of the quality of GNSS signals (e.g., wireless signals 118) received by wireless device 102, which in turn may indicate how reliable a geographic location determined from those GNSS signals is (if a geographic location can even be determined from the received GNSS signals) include signal strength, residuals (which may provide an indication of inconsistent measurements among GNSS signals received from different satellites 104), and any other suitable indicators. In certain embodiments, parameters for determining whether or not a geographic location determined from wireless signals 118 may include any one of these or other indicators, and a predetermined threshold may establish a value for one or more of these indicators. Location determination logic 138 may determine that a geographic location determined from received wireless signals 118 is unreliable by determining that one or more parameters associated with the determined geographic location is below a predetermined threshold for these or other indicators.

If location determination logic 138 determines at step 906 that the wireless-based mobile device positioning system is reliable, then at step 908, location determination logic 138 may determine a geographic location of mobile device 102 using the wireless-based mobile device positioning system. For example, location determination logic 138 may determine the geographic location of mobile device 102 using the GNSS system. At step 910, location determination logic 138 may provide the determined geographic location to navigation system 222. Although method 900 includes providing the determined geographic location to navigation system 222, this disclosure contemplates providing the determined geographic location to additional system(s), providing the determined geographic location to alternative system(s) (e.g., in place of navigation system 222), or not providing the determined geographic location to any other system.

Proceeding to step 912, location determination logic 138 may determine whether the position system is off. In other words, location determination logic 138 may determine whether there is a continued objective to determine the geographic location of mobile device 102. If location determination logic 138 determines at step 912 that the position system is off, then the method may end at step 914. If, on the other hand, location determination logic 138 determines at step 912 that the position system is not off, then the method may return to step 904 to attempt to determine a geographic location of mobile device 102 using the wireless-based mobile device positioning system (e.g., the GNSS system).

Returning to step 906, if location determination logic 138 determines that that the wireless-based mobile device positioning system is not reliable, then the method may proceed to step 916. At step 916, location determination logic 138 may access the last determined geographic location of mobile device 102. The last determined geographic location of mobile device 102 may be the last geographic location of mobile device 102 that was determined by location determination logic 138 to be reliable. As a particular example, the last geographic location of mobile device 102 determined to be reliable may be the last geographic location of mobile device 102 determined using the wireless-based mobile device positioning system before location determination logic 138 determined that the wireless-based mobile device positioning system is no longer reliable. As an even more particular example, the last determined geographic location of mobile device 102 may be the last geographic location of mobile device 102 determined using the GNSS system before location determination logic 138 determined that the GNSS system is no longer reliable (e.g., because GNSS receiver 116 is not able to receive wireless signals 118 from satellites 104).

At step 918, location determination logic 138 may determine whether geographic data is available. In certain embodiments, location determination logic 138 may determine whether geographic data for the last determined geographic location is available in either geographic database 122 (as geographic data 124) or geographic database 106 (as geographic data 126). In certain embodiments, location determination logic 138 may determine whether geographic data (124 or 126, as appropriate) is available for a particular area or within a particular distance range of the last determined geographic location of mobile device 102.

As a particular example, location determination logic 138 may determine whether geographic database 122 includes any geographic data 124. If location determination logic 138 determines that geographic database 122 includes geographic data 124, then location determination logic 138 may determine whether the geographic data 124 of geographic database 122 includes geographic data for a particular area or within a particular distance range of the last determined geographic location of mobile device 102. If location determination logic 138 determines that geographic data 124 of geographic database 122 includes geographic data for a particular area or within a particular distance range of the last determined geographic location of mobile device 102, then location determination logic 138 may conclude at step 918 that geographic data is available.

If, on the other hand, location determination logic 138 determines that geographic database 122 does not include geographic data 124 or that geographic data 124 of geographic database 122 does not include geographic data for a particular area or within a particular distance range of the last determined geographic location of mobile device 102, then location determination logic 138 may determine whether geographic database 106 includes any geographic data 126. If location determination logic 138 determines that geographic database 106 includes geographic data 126, then location determination logic 138 may determine whether the geographic data 126 of geographic database 106 includes geographic data for a particular area or within a particular distance range of the last determined geographic location of mobile device 102. If location determination logic 138 determines that geographic data 126 of geographic database 106 includes geographic data for a particular area or within a particular distance range of the last determined geographic location of mobile device 102, then location determination logic 138 may retrieve relevant geographic data (e.g., geographic data for a particular area or within a particular distance range of the last determined geographic location of mobile device 102) from geographic data 126 and store the retrieved geographic data as geographic data 124 in geographic database 122. Additionally, location determination logic 138 may conclude at step 918 that geographic data is available.

In some scenarios, mobile device 102 may be in a situation where it is unable to access network 108 and thereby unable to access geographic database 106. In such a scenario, if location determination logic 138 determines that geographic database 122 does not include geographic data 124 or that geographic data 124 of geographic database 122 does not include geographic data for a particular area or within a particular distance range of the last determined geographic location of mobile device 102, then location determination logic 138 may conclude at step 918 that geographic data is not available.

Although this disclosure describes particular techniques for location determination logic 138 to determine whether geographic data is available, this disclosure contemplates location determination logic 138 (or another suitable component of system 100/200) determining whether geographic data is available in any suitable manner.

If location determination logic 138 determines at step 918 that geographic data 124 is not available, then the method may proceed to step 912, described above. If, on the other hand, location determination logic 138 determines at step 918 that geographic data 124 is available, then at step 920, location determination logic 138 may access geographic data 124.

At step 922, location determination logic 138 determines a set of candidate geographical locations for adjusting the last determined geographic location of mobile device 102. For example, the set of candidate geographical locations may be a number of geographical locations within a predefined distance of the last determined geographic location of mobile device 102. In certain embodiments, the set of candidate geographical locations are multiple locations along a particular road that is closest, as determined from geographic data 124, to the last determined geographic location of mobile device 102.

At step 924, location determination logic 138 accesses a value of a first type determined according to a measurement of a first sensor 120. The first sensor 120 could include, for example, any of the sensors 120 described above with reference to FIGS. 1 and 2. Taking a particular example, the first sensor 120 could be a gyroscope (or an IMU that includes a gyroscope), and the value of the first type could be a heading determined either by the gyroscope or based on output from the gyroscope. Although a gyroscope is described as the first sensor 120 and a heading is described as the value of the first type, this disclosure contemplates other sensors and sensor measurements (or values determined from the sensor measurements) being the first sensor and value of the first type. For example, the first sensor 120 may be an altimeter or pressure sensor (and the value of the first type may be an altitude), a magnetometer (and the value of the first type may be an altitude), a light sensor (and the value of the first type may be an altitude), a LiDAR sensor (and the value of the first type may be an altitude), or any other suitable type of sensor.

At step 926, location determination logic 138 attempts to determine, based on the set of candidate geographical locations and on the value of the first type and the geographic data, a second location. For example, location determination logic 138 may attempt to determine, based on the set of candidate geographical locations and on the value of the first type and the geographic data, a second location that is a unique location. Although described as unique, it should be understood that the geographic location may be unique within a particular area or distance range of the last determined location of mobile device 102. As another example, unique could include a reasonable number of geographic locations within a particular area or distance range of the last determined location of mobile device 102. In certain embodiments, this reasonable number of geographic locations may be adjacent geographic locations. As a real world example, location determination logic 138 may determine that three adjacent geographic locations in geographic data 124 have a road heading that corresponds to (e.g., matches) the detected heading of mobile device 102 since the road heading may be generally constant over this short stretch of road. The present disclosure contemplates location determination logic 138 determining that this relatively small set of adjacent geographic locations is unique enough to be able to determine a second geographic location of mobile device 102, and further contemplates resolving which of these geographic locations (or a geographic location calculated from this geographic location) will be used as the second location.

As a first example, the first sensor 120 may be a gyroscope, and the value of the first type may be a heading. In this example, location determination logic 138 may attempt to determine from a geographic data 124 a geographic location from the candidate geographic locations that has a road heading that corresponds to the heading determined from the first sensor 120.

As another example, the first sensor 120 may be an altimeter or pressure sensor, and the value of the first type may be an altitude. In this example, location determination logic 138 may attempt to determine from a geographic data 124 a geographic location from the candidate geographic locations that has an altitude that that corresponds to the altitude determined from first sensor 120.

As another example, the first sensor 120 may be a magnetometer, and the value of the first type may be a local magnetic field event. In this example, location determination logic 138 may attempt to determine from a geographic data 124 a geographic location from the candidate geographic locations that has a local magnetic field pattern that that corresponds to the local magnetic field event determined from first sensor 120.

As another example, the first sensor 120 may be a light sensor, and the value of the first type may be a light intensity. In this example, location determination logic 138 may attempt to determine from a geographic data 124 a geographic location from the candidate geographic locations that has a light intensity that that corresponds to the light intensity determined from first sensor 120.

As another example, the first sensor 120 may be a LiDAR sensor, and the value of the first type may be a three-dimensional point cloud geographic position. In this example, location determination logic 138 may attempt to determine from a geographic data 124 a geographic location from the candidate geographic locations that has a three-dimensional point cloud geographic position that that corresponds to the three-dimensional point cloud geographic position determined from first sensor 120.

At step 928, location determination logic 138 determines whether it was able to determine a unique second geographic location at step 926. For example, location determination logic 138 may determine whether a unique second geographic location could be determined based on the set of candidate geographical locations and on the value of the first type and the geographic data.

If location determination logic 138 determines at step 928 that it was able to determine a unique second geographic location at step 926, then at step 930, location determination logic 138 adjusts the last known geographic location of mobile device 102 to be the determined unique second geographic location. In certain scenarios, the last known geographic location is the last geographic location of mobile device 102 determined using the wireless-based mobile device positioning system. For example, if the determined second geographic location is the first location update since mobile device 102 lost the ability to determine a reliable geographic location using the wireless-based mobile device positioning system, then the last known geographic location of mobile device 102 may be the last geographic location of mobile device 102 determined using the wireless-based mobile device positioning system (prior to mobile device 102 losing the ability to determine a reliable geographic location using the wireless-based mobile device positioning system). In another scenario, the last known geographic location is the last geographic location determined using data from one or more sensors 120 of mobile device (which may have been one or multiple location updates since mobile device 102 lost the ability to determine a reliable geographic location using the wireless-based mobile device positioning system, for example). In another scenario, the last known geographic location is the last geographic location determined using one or more other location systems (e.g., a dead-reckoning system) of mobile device 102, possibly in combination with data from one or more sensors 120 of mobile device.

The method may return to step 912, at which location determination logic 138 may determine whether the position system is off and proceed according to the determination at step 912.

Returning to step 928, if location determination logic 138 determines at step 928 that it was unable to determine a unique second geographic location at step 926, then the method proceeds to step 932. As step 932, location determination logic 138 accesses a value of a second type determined according to a measurement of a second sensor 120. The second sensor 120 could include, for example, any of the sensors 120 described above with reference to FIGS. 1 and 2. Taking a particular example, the second sensor 120 could be an altimeter or pressure sensor, and the value of the second type could be an altitude determined either by the altimeter (or pressure sensor) or based on output from the altimeter (or pressure sensor). Although an altimeter or pressure sensor is described as the second sensor and an altitude is described as the value of the second type, this disclosure contemplates other sensors and sensor measurements (or values determined from the sensor measurements) being the second sensor and value of the second type. In certain embodiments, the second sensor 120 is a different type of sensor than the first sensor 120, and the second type of value is different than the first type of value.

At step 934, location determination logic 138 attempts to determine, based on the set of candidate geographical locations and on the value of the second type and the geographic data, a third location.

As a first example, the second sensor 120 may be a gyroscope, and the value of the second type may be a heading. In this example, location determination logic 138 may attempt to determine from a geographic data 124 a geographic location from the candidate geographic locations that has a road heading that corresponds to the heading determined from the second sensor 120.

As another example, the second sensor 120 may be an altimeter or pressure sensor, and the value of the second type may be an altitude. In this example, location determination logic 138 may attempt to determine from a geographic data 124 a geographic location from the candidate geographic locations that has an altitude that that corresponds to the altitude determined from second sensor 120.

As another example, the second sensor 120 may be a magnetometer, and the value of the second type may be a local magnetic field event. In this example, location determination logic 138 may attempt to determine from a geographic data 124 a geographic location from the candidate geographic locations that has a local magnetic field pattern that that corresponds to the local magnetic field event determined from second sensor 120.

As another example, the second sensor 120 may be a light sensor, and the value of the second type may be a light intensity. In this example, location determination logic 138 may attempt to determine from a geographic data 124 a geographic location from the candidate geographic locations that has a light intensity that that corresponds to the light intensity determined from second sensor 120.

As another example, the second sensor 120 may be a LiDAR sensor, and the value of the second type may be a three-dimensional point cloud geographic position. In this example, location determination logic 138 may attempt to determine from a geographic data 124 a geographic location from the candidate geographic locations that has a three-dimensional point cloud geographic position that that corresponds to the three-dimensional point cloud geographic position determined from second sensor 120.

At step 936, location determination logic 138 determines whether it was able to determine a unique third geographic location at step 934. For example, location determination logic 138 may determine whether a unique third geographic location could be determined based on the set of candidate geographical locations and on the value of the second type and the geographic data.

If location determination logic 138 determines at step 936 that it was able to determine a unique third geographic location at step 934, then at step 938, location determination logic 138 adjusts the last known geographic location of mobile device 102 to be the determined unique third geographic location. In certain scenarios, the last known geographic location is the last geographic location of mobile device 102 determined using the wireless-based mobile device positioning system. For example, if the determined third geographic location is the first location update since mobile device 102 lost the ability to determine a reliable geographic location using the wireless-based mobile device positioning system, then the last known geographic location of mobile device 102 may be the last geographic location of mobile device 102 determined using the wireless-based mobile device positioning system (prior to mobile device 102 losing the ability to determine a reliable geographic location using the wireless-based mobile device positioning system). In another scenario, the last known geographic location is the last geographic location determined using data from one or more sensors 120 of mobile device (which may have been one or multiple location updates since mobile device 102 lost the ability to determine a reliable geographic location using the wireless-based mobile device positioning system, for example). In another scenario, the last known geographic location is the last geographic location determined using one or more other location systems (e.g., a dead-reckoning system) of mobile device 102, possibly in combination with data from one or more sensors 120 of mobile device.

The method may return to step 912, at which location determination logic 138 may determine whether the position system is off and proceed according to the determination at step 912.

Returning to step 936, if location determination logic 138 determines at step 936 that it was unable to determine a unique third geographic location at step 934, then the method proceeds to step 940. As step 940, location determination logic 138 accesses a value of a third type determined according to a measurement of a third sensor 120. The third sensor 120 could include, for example, any of the sensors 120 described above with reference to FIGS. 1 and 2. Taking a particular example, the third sensor 120 could be a magnetometer, and the value of the third type could be a local magnetic field event determined either by the magnetometer or based on output from the magnetometer. Although a magnetometer is described as the third sensor and a local magnetic field event is described as the value of the third type, this disclosure contemplates other sensors and sensor measurements (or values determined from the sensor measurements) being the third sensor and value of the third type. In certain embodiments, the third sensor 120 is a different type of sensor than the first and second sensors 120 (e.g., used at steps 924-926 and steps 932 and 934, respectively), and the third type of value is different than the first type of value and the second type of value (e.g., used at steps 924-926 and steps 932 and 934, respectively).

At step 942, location determination logic 138 attempts to determine, based on the set of candidate geographical locations and on the value of the second type and the geographic data, a fourth location.

As a first example, the third sensor 120 may be a gyroscope, and the value of the third type may be a heading. In this example, location determination logic 138 may attempt to determine from a geographic data 124 a geographic location from the candidate geographic locations that has a road heading that corresponds to the heading determined from the third sensor 120.

As another example, the third sensor 120 may be an altimeter or pressure sensor, and the value of the third type may be an altitude. In this example, location determination logic 138 may attempt to determine from a geographic data 124 a geographic location from the candidate geographic locations that has an altitude that that corresponds to the altitude determined from third sensor 120.

As another example, the third sensor 120 may be a magnetometer, and the value of the third type may be a local magnetic field event. In this example, location determination logic 138 may attempt to determine from a geographic data 124 a geographic location from the candidate geographic locations that has a local magnetic field pattern that that corresponds to the local magnetic field event determined from third sensor 120.

As another example, the third sensor 120 may be a light sensor, and the value of the third type may be a light intensity. In this example, location determination logic 138 may attempt to determine from a geographic data 124 a geographic location from the candidate geographic locations that has a light intensity that that corresponds to the light intensity determined from third sensor 120.

As another example, the third sensor 120 may be a LiDAR sensor, and the value of the third type may be a three-dimensional point cloud geographic position. In this example, location determination logic 138 may attempt to determine from a geographic data 124 a geographic location from the candidate geographic locations that has a three-dimensional point cloud geographic position that that corresponds to the three-dimensional point cloud geographic position determined from third sensor 120.

At step 944, location determination logic 138 determines whether it was able to determine a unique fourth geographic location at step 942. For example, location determination logic 138 may determine whether a unique fourth geographic location could be determined based on the set of candidate geographical locations and on the value of the third type and the geographic data.

If location determination logic 138 determines at step 944 that it was able to determine a unique fourth geographic location at step 942, then at step 946, location determination logic 138 adjusts the last known geographic location of mobile device 102 to be the determined unique fourth geographic location. In certain scenarios, the last known geographic location is the last geographic location of mobile device 102 determined using the wireless-based mobile device positioning system. For example, if the determined fourth geographic location is the first location update since mobile device 102 lost the ability to determine a reliable geographic location using the wireless-based mobile device positioning system, then the last known geographic location of mobile device 102 may be the last geographic location of mobile device 102 determined using the wireless-based mobile device positioning system (prior to mobile device 102 losing the ability to determine a reliable geographic location using the wireless-based mobile device positioning system). In another scenario, the last known geographic location is the last geographic location determined using data from one or more sensors 120 of mobile device (which may have been one or multiple location updates since mobile device 102 lost the ability to determine a reliable geographic location using the wireless-based mobile device positioning system, for example). In another scenario, the last known geographic location is the last geographic location determined using one or more other location systems (e.g., a dead-reckoning system) of mobile device 102, possibly in combination with data from one or more sensors 120 of mobile device.

The method may return to step 912, at which location determination logic 138 may determine whether the position system is off and proceed according to the determination at step 912.

Returning to step 944, if location determination logic 138 determines at step 944 that it was unable to determine a unique fourth geographic location at step 944, then the method may return to step 912, at which location determination logic 138 may determine whether the position system is off and proceed according to the determination at step 912.

Although for a particular pass through method 900, FIG. 9 illustrates location determination logic 138 accessing values for three types of sensors and performing three associated attempts to determine a unique updated geographic location of mobile device 102, this disclosure contemplates location determination logic 138 (or another suitable component of system 100/200) accessing values for more or fewer types of sensors and performing more or fewer associated attempts to determine a unique updated geographic location of mobile device 102.

Figure 10:
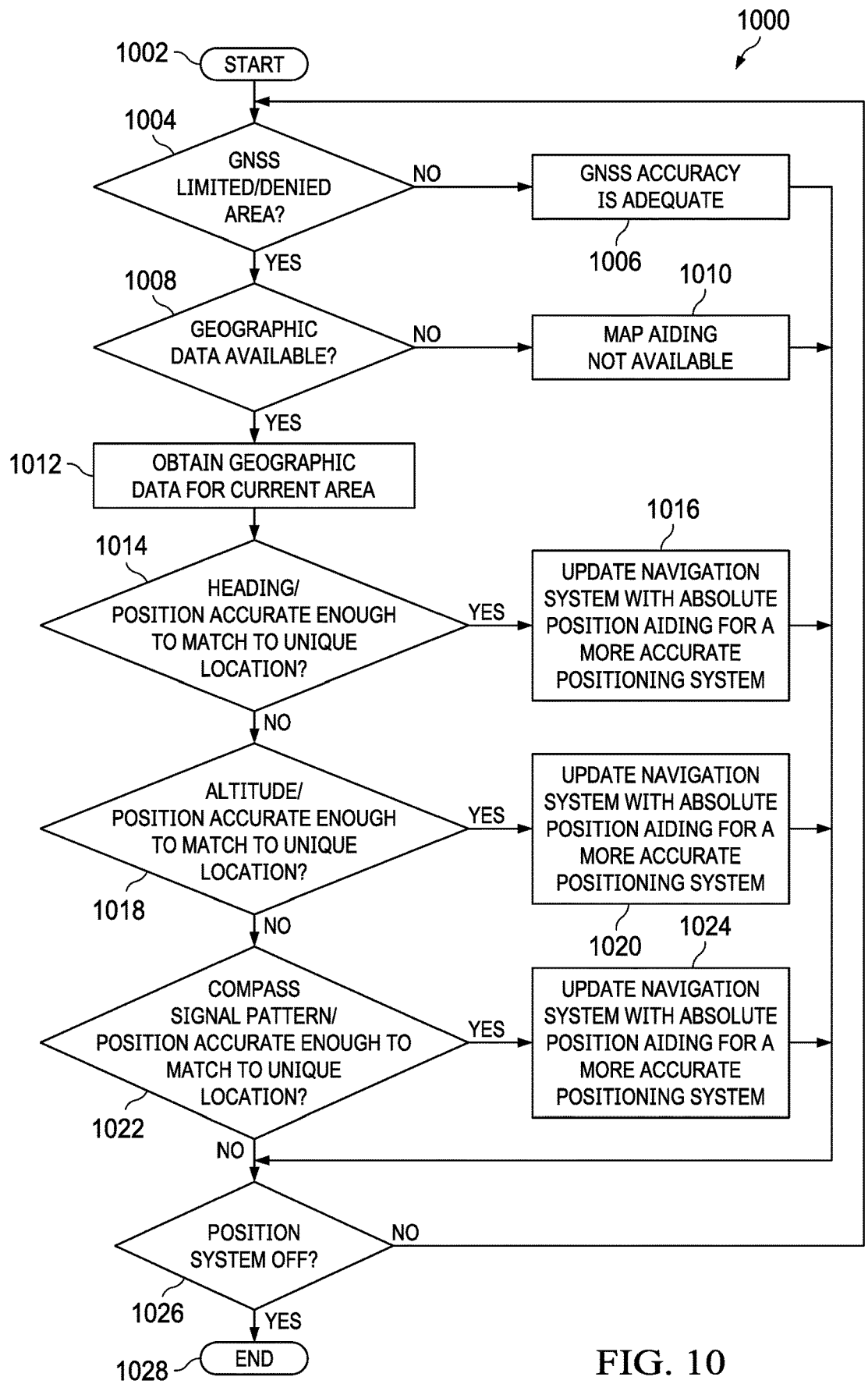
FIG. 10 illustrates an example method for determining a geographic location of a mobile device using sensor data, according to certain embodiments of the present disclosure.

FIG. 10 illustrates an example method 1000 for determining a geographic location of a mobile device 102 using sensor data, according to certain embodiments of the present disclosure.

The method begins at step 1002. At step 1004, location determination logic 138 determines whether mobile device 102 is in an area with limited or denied GNSS service. In certain embodiments, location determination logic 138 attempts to determine a geographic location of mobile device 102 using a wireless-based mobile device positioning system. For example, location determination logic may attempt to determine a geographic location of mobile device 102 using a GNSS system (e.g., GNSS receiver receiving wireless signals 118 from one or more satellites 104). Although the GNSS system (e.g., GNSS receiver 116, satellites 104 and wireless signals 118) are described, this disclosure contemplates location determination logic 138 determining the availability of any wireless-based mobile device positioning system or combination of wireless-based mobile device positioning systems.

If location determination logic 138 determines at step 1004 that mobile device 102 is not in an area with limited or denied GNSS service, then at step 1006, location determination logic 138 may determine that GNSS accuracy is adequate (e.g., that a geographic location determined using the GNSS system is reliable), which may include determining an updated geographic location using the GNSS system. The method then proceeds to step 1026, described below. If location determination logic 138 determines at step 1004 that mobile device 102 is in an area with limited or denied GNSS service, then the method may proceed to step 1008.

At step 1008, location determination logic 138 determines whether geographic data for the current area of mobile device 102 is available. The current area may include, for example, an area or distance range from the last determined geographic location for mobile device 102. In certain embodiments, location determination logic 138 may determine whether geographic data for the last determined geographic location is available in either geographic database 122 (as geographic data 124) or geographic database 106 (as geographic data 126). In certain embodiments, location determination logic 138 may determine whether geographic data (124 or 126, as appropriate) is available for a particular area or within a particular distance range of the last determined geographic location of mobile device 102.

As a particular example, location determination logic 138 may determine whether geographic database 122 includes any geographic data 124. If location determination logic 138 determines that geographic database 122 includes geographic data 124, then location determination logic 138 may determine whether the geographic data 124 of geographic database 122 includes geographic data for a particular area or within a particular distance range of the last determined geographic location of mobile device 102. If location determination logic 138 determines that geographic data 124 of geographic database 122 includes geographic data for a particular area or within a particular distance range of the last determined geographic location of mobile device 102, then location determination logic 138 may conclude at step 1008 that geographic data is available.

If, on the other hand, location determination logic 138 determines that geographic database 122 does not include geographic data 124 or that geographic data 124 of geographic database 122 does not include geographic data for a particular area or within a particular distance range of the last determined geographic location of mobile device 102, then location determination logic 138 may determine whether geographic database 106 includes any geographic data 126. If location determination logic 138 determines that geographic database 106 includes geographic data 126, then location determination logic 138 may determine whether the geographic data 126 of geographic database 106 includes geographic data for a particular area or within a particular distance range of the last determined geographic location of mobile device 102. If location determination logic 138 determines that geographic data 126 of geographic database 106 includes geographic data for a particular area or within a particular distance range of the last determined geographic location of mobile device 102, then location determination logic 138 may retrieve relevant geographic data (e.g., geographic data for a particular area or within a particular distance range of the last determined geographic location of mobile device 102) from geographic data 126 and store the retrieved geographic data as geographic data 124 in geographic database 122. Additionally, location determination logic 138 may conclude at step 1008 that geographic data is available.

In some scenarios, mobile device 102 may be in a situation where it is unable to access network 108 and thereby unable to access geographic database 106. In such a scenario, if location determination logic 138 determines that geographic database 122 does not include geographic data 124 or that geographic data 124 of geographic database 122 does not include geographic data for a particular area or within a particular distance range of the last determined geographic location of mobile device 102, then location determination logic 138 may conclude at step 1008 that geographic data is not available.

Although this disclosure describes particular techniques for location determination logic 138 to determine whether geographic data is available, this disclosure contemplates location determination logic 138 (or another suitable component of system 100/200) determining whether geographic data is available in any suitable manner.

If location determination logic 138 determines at step 1008 that geographic data for the current area is not available, then at step 1010, location determination logic 138 may determine that map aiding, including map aiding based on sensor data from one or more sensors 120, is not available. The method may then proceed to step 1026, described below. If location determination logic 138 determines at step 1008 that geographic data for the current area is available, then the method may proceed to step 1014.

If, on the other hand, location determination logic 138 determines at step 1008 that geographic data for the current area is available, then at step 1012, location determination logic 138 obtains geographic data for the current area. For example, as described above, to the extent geographic data 124 of geographic database 122 includes geographic data for the current area, location determination logic 138 may access geographic data for the current area from geographic data 124. As another example, as described above, to the extent geographic data 124 of geographic database 122 does not include geographic data for the current area, location determination logic 138 may access geographic data for the current area from geographic data 126 of geographic database 106, if possible. If appropriate in this latter scenario, location determination logic 138 may retrieve the geographic data for the current area from geographic data 126 and store the retrieved geographic data for the current area in geographic database 122 (as geographic data 124).

At step 1014, location determination logic 138 determines whether a position (e.g., a geographic location) determined from a heading determined according to a measurement of the gyroscope of mobile device 102 is accurate enough to match to a unique geographic location. Thus, in this example, the first sensor 120 is a gyroscope (or an IMU that includes a gyroscope).

In certain embodiments, location determination logic 138 determines a set of candidate geographical locations for adjusting the last determined geographic location of mobile device 102. For example, the set of candidate geographical locations may be a number of geographical locations within a predefined distance of the last determined geographic location of mobile device 102. In certain embodiments, the set of candidate geographical locations are multiple locations along a particular road that is closest, as determined from geographic data 124, to the last determined geographic location of mobile device 102.

Location determination logic 138 accesses a heading determined according to a measurement of the gyroscope (or an IMU that includes a gyroscope) of mobile device 102. Location determination logic 138 attempts to determine, based on the set of candidate geographical locations and on the heading determined according to the measurement of the gyroscope and the geographic data, a second location. For example, location determination logic 138 may attempt to determine, based on the set of candidate geographical locations and on the heading determined according to the measurement of the gyroscope and the geographic data, a second location that is a unique location. Although described as unique, it should be understood that the geographic location may be unique within a particular area or distance range of the last determined location of mobile device 102. As another example, unique could include a reasonable number of geographic locations within a particular area or distance range of the last determined location of mobile device 102. In certain embodiments, this reasonable number of geographic locations may be adjacent geographic locations.

In this example in which the sensor 120 is a gyroscope, location determination logic 138 may attempt to determine from geographic data 124 a geographic location from the candidate geographic locations that has a road heading that corresponds to the heading determined from gyroscope of mobile device 102. Step 1014 may include location determination logic 138 determining whether it was able to determine a unique second geographic location based on the set of candidate geographical locations and on the heading (determined from a measurement of the gyroscope of mobile device 102) and the geographic data 124 (e.g., the road headings mapped to particular geographic locations in geographic data 124).

If location determination logic 138 determines at step 1014 that the position (e.g., the geographic location) determined from a heading determined according to a measurement of the gyroscope of mobile device 102 is accurate enough to match to a unique geographic location, then at step 1016, location determination logic 138 may update the navigation system with absolute position aiding, which may provide a more accurate positioning system. For example, location determination logic 138 may adjust the last known geographic location of mobile device 102 to be the determined unique second geographic location and may provide this second geographic location to the navigation system, if appropriate. In certain scenarios, the last known geographic location is the last geographic location of mobile device 102 determined using the wireless-based mobile device positioning system. For example, if the determined second geographic location is the first location update since mobile device 102 lost the ability to determine a reliable geographic location using the wireless-based mobile device positioning system, then the last known geographic location of mobile device 102 may be the last geographic location of mobile device 102 determined using the wireless-based mobile device positioning system (prior to mobile device 102 losing the ability to determine a reliable geographic location using the wireless-based mobile device positioning system). In another scenario, the last known geographic location is the last geographic location determined using data from one or more sensors 120 of mobile device (which may have been one or multiple location updates since mobile device 102 lost the ability to determine a reliable geographic location using the wireless-based mobile device positioning system, for example). In another scenario, the last known geographic location is the last geographic location determined using one or more other location systems (e.g., a dead-reckoning system) of mobile device 102, possibly in combination with data from one or more sensors 120 of mobile device.

If location determination logic 138 determines at step 1014 that the position (e.g., the geographic location) determined from a heading determined according to a measurement of the gyroscope of mobile device 102 is not accurate enough to match to a unique geographic location, then the method may proceed to step 1018. At step 1018, location determination logic 138 determines whether a position (e.g., a geographic location) determined from an altitude determined according to a measurement of the altimeter/pressure sensor of mobile device 102 is accurate enough to match to a unique geographic location. Thus, in this example, the second sensor 120 is an altimeter/pressure sensor.

Location determination logic 138 accesses an altitude determined according to a measurement of the magnetometer (or pressure sensor) of mobile device 102. Location determination logic 138 attempts to determine, based on the set of candidate geographical locations and on the altitude determined according to the measurement of the magnetometer (or pressure sensor) and the geographic data, a second location. For example, location determination logic 138 may attempt to determine, based on the set of candidate geographical locations and on the altitude determined according to the measurement of magnetometer (or pressure sensor) and the geographic data, a second location that is a unique location. Again, although described as unique, it should be understood that the geographic location may be unique within a particular area or distance range of the last determined location of mobile device 102. As another example, unique could include a reasonable number of geographic locations within a particular area or distance range of the last determined location of mobile device 102. In certain embodiments, this reasonable number of geographic locations may be adjacent geographic locations.

In this example in which the sensor 120 is a magnetometer (or pressure sensor), location determination logic 138 may attempt to determine from geographic data 124 a geographic location from the candidate geographic locations that has an altitude that corresponds to the altitude determined from the magnetometer (or pressure sensor) of mobile device 102. Step 1018 may include location determination logic 138 determining whether it was able to determine a unique second geographic location based on the set of candidate geographical locations and on the altitude (determined from a measurement of the altimeter or pressure sensor of mobile device 102) and the geographic data 124 (e.g., the altitudes mapped to particular geographic locations in geographic data 124).

If location determination logic 138 determines at step 1018 that the position (e.g., the geographic location) determined from the altitude determined according to a measurement of the altimeter/pressure sensor of mobile device 102 is accurate enough to match to a unique geographic location, then at step 1020, location determination logic 138 may update the navigation system with absolute position aiding, which may provide a more accurate positioning system. For example, location determination logic 138 may adjust the last known geographic location of mobile device 102 to be the determined unique second geographic location and may provide this second geographic location to the navigation system, if appropriate.

If location determination logic 138 determines at step 1018 that the position (e.g., the geographic location) determined from the altitude determined according to a measurement of the altimeter/pressure sensor of mobile device 102 is not accurate enough to match to a unique geographic location, then the method may proceed to step 1022. At step 1022, location determination logic 138 determines whether a position (e.g., a geographic location) determined from compass signal pattern (or other local magnetic field pattern) determined according to a measurement of a compass (or other magnetometer) of mobile device 102 is accurate enough to match to a unique geographic location. Thus, in this example, the third sensor 120 is a compass other magnetometer.

Location determination logic 138 accesses a compass signal pattern determined according to a measurement of the compass (or other magnetometer) of mobile device 102. Location determination logic 138 attempts to determine, based on the set of candidate geographical locations and on the compass signal pattern determined according to the measurement of the compass (or other magnetometer) and the geographic data, a second location. For example, location determination logic 138 may attempt to determine, based on the set of candidate geographical locations and on the compass signal pattern determined according to the measurement of compass (or other magnetometer) and the geographic data, a second location that is a unique location. Again, although described as unique, it should be understood that the geographic location may be unique within a particular area or distance range of the last determined location of mobile device 102. As another example, unique could include a reasonable number of geographic locations within a particular area or distance range of the last determined location of mobile device 102. In certain embodiments, this reasonable number of geographic locations may be adjacent geographic locations.

In this example in which the sensor 120 is a compass (or other magnetometer), location determination logic 138 may attempt to determine from geographic data 124 a geographic location from the candidate geographic locations that has local magnetic field event pattern that corresponds to the compass signal pattern determined from the compass (or magnetometer) of mobile device 102. Step 1022 may include location determination logic 138 determining whether it was able to determine a unique second geographic location based on the set of candidate geographical locations and on the compass signal pattern (determined from a measurement of the compass or other magnetometer of mobile device 102) and the geographic data 124 (e.g., the local magnetic field event patterns mapped to particular geographic locations in geographic data 124).

If location determination logic 138 determines at step 1022 that the position (e.g., the geographic location) determined from the compass signal pattern (or other local magnetic field pattern) determined according to a measurement of the compass (or other magnetometer) of mobile device 102 is accurate enough to match to a unique geographic location, then at step 1024, location determination logic 138 may update the navigation system with absolute position aiding, which may provide a more accurate positioning system. For example, location determination logic 138 may adjust the last known geographic location of mobile device 102 to be the determined unique second geographic location and may provide this second geographic location to the navigation system, if appropriate.

If location determination logic 138 determines at step 1022 that the position (e.g., the geographic location) determined from the compass signal pattern (or other local magnetic field pattern) determined according to a measurement of the compass (or other magnetometer) of mobile device 102 is not accurate enough to match to a unique geographic location, then the method may proceed to step 1026.

At step 1026, location determination logic 138 may determine whether the position system is off. In other words, location determination logic 138 may determine whether there is a continued objective to determine the geographic location of mobile device 102. If location determination logic 138 determines at step 1026 that the position system is off, then the method may end at step 1028. If, on the other hand, location determination logic 138 determines at step 1026 that the position system is not off, then the method may return to step 1004 to attempt to determine a geographic location of mobile device 102.

Although for a particular pass through method 1000, FIG. 10 illustrates location determination logic 138 accessing values for three types of sensors and performing three associated attempts to determine a unique updated geographic location of mobile device 102, this disclosure contemplates location determination logic 138 (or another suitable component of system 100/200) accessing values for more or fewer types of sensors and performing more or fewer associated attempts to determine a unique updated geographic location of mobile device 102. For example, although the particular sensors 120 used in method 1000 are a gyroscope, altimeter, and compass, this disclosure contemplates using any suitable combination of any suitable types of sensors 120 in method 1000. The sensors may include, for example, any of the sensors 120 described above with reference to FIGS. 1 and 2. As particular examples, the sensors 120 could be a gyroscope (or an IMU that includes a gyroscope), an altimeter or pressure sensor (and the value of the first type may be an altitude), a magnetometer (and the value of the first type may be an altitude), a light sensor (and the value of the first type may be an altitude), a LiDAR sensor (and the value of the first type may be an altitude), or any other suitable type of sensor.

Although use of sensors 120 is described in a particular order and as being triggered based on certain decisions from the prior sensor 120, this disclosure contemplates sensors 120 being used in any suitable combination (including individually), and in any particular order. For example, in certain scenarios, a combination of multiple sensors 120 may be used to determine a geographical location of mobile device 102. In other words, location determination logic 138 may attempt to determine a unique geographic location of mobile device 102 by comparing output from multiple sensors 120 to geographic data 124 in parallel to attempt to identify the most accurate geographic location of mobile device 102. In certain embodiments, this parallel comparison comparing output from multiple sensors 120 to geographic data 124 in parallel to attempt to identify the most accurate geographic location of mobile device 102. Alternatively, location determination logic 138 could compare output from multiple sensors 120 to geographic data 124 serially to attempt to identify the most accurate geographic location of mobile device 102. In other words, rather than evaluating a next sensor only in response to determining that location determination logic 138 was unable to determine an accurate position using a previous sensor, location determination logic 138 may compare output from a next sensor to geographic data 124 regardless of whether location determination logic 138 was able to determine an accurate position using the previous sensor.

As another example, even when location determination logic 138 determines that GNSS system (or another wireless-based mobile device positioning system) is reliable, sensor data from one or more sensors and a comparison to geographic data 124 still may be useful, as such a comparison may help to further determine even more accurately the geographic location of mobile device 102. As a particular example, some cities include roadways that are stacked with a first roadway highway running generally parallel to but positioned some distance above a second roadway. For example, one of the two roadways may include a number of exits, while the other roadway is an "express" roadway that includes relatively fewer, if any, exits. While the GNSS system, even if available, may be able to resolve a geographic location of a mobile device to the path of the two roadways, location determination logic of a mobile device may have difficulty resolving, based on the GNSS system, on which of the two roadways the mobile device 102 is located. This could be critical information to a user of mobile device 102, as the user may be relying on a navigation system to inform the user of a correct route that includes an exit available on only one of the two roadways, for example. According to certain embodiments of this disclosure, location determination logic 138 may be able to, in addition to evaluating data from the GNSS system, compare an a measurement from one or more of sensors 120 (e.g., in this example, an altitude determined from an altimeter or pressure sensor of mobile device 102 may be particularly helpful), compare the measurement to geographic data 124, and further determine a more accurate geographic location of mobile device 102.

The above scenarios provide just one example of how data from sensors 120 and comparisons to geographic data 124 may assist in determining a geographic location of mobile device 102, even when data from a wireless-based mobile device positioning system is available. This disclosure contemplates using data from sensors 120 and comparisons to geographic data 124

Figure 11:
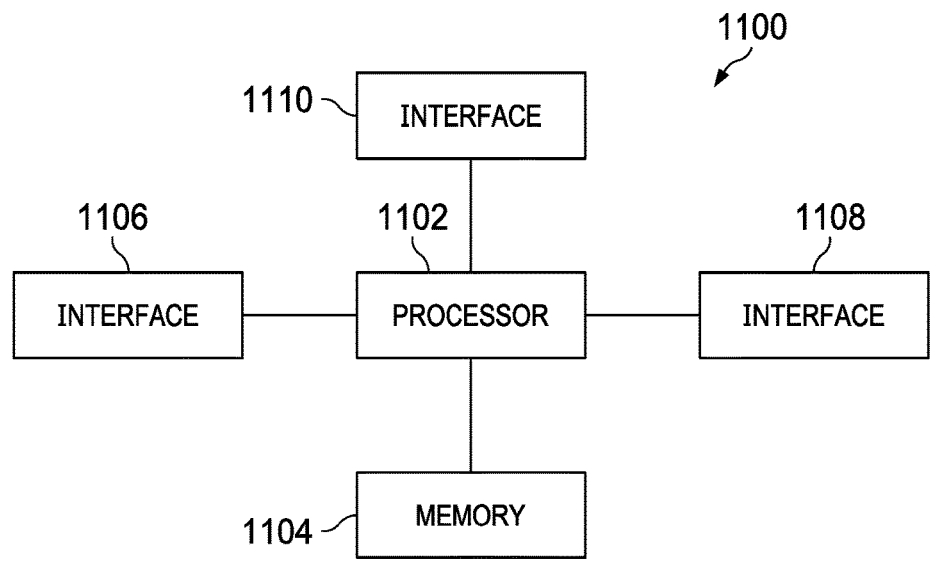
FIG. 11 illustrates a block diagram of an example processing system, according to certain embodiments of the present disclosure.

FIG. 11 illustrates a block diagram of an example processing system 1100, according to certain embodiments of the present disclosure. Processing system 1100 may be configured to perform methods described in this disclosure, and may be installed in a host device. As shown, processing system 1100 includes a processor 1102, a memory 1104, and interfaces 1106-1110, which may (or may not) be arranged as shown in FIG. 11. Processor 1102 may be any component or collection of components adapted to perform computations and/or other processing related tasks, and the memory 1104 may be any component or collection of components adapted to store programming and/or instructions for execution by processor 1102. In an embodiment, memory 1104 includes a non-transitory computer readable medium. The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

In some embodiments, processing system 1100 is included in a network device that is accessing, or part otherwise of, a telecommunications network. In one example, processing system 1100 is in a network-side device in a wireless or wireline telecommunications network, such as a base station, a relay station, a scheduler, a controller, a gateway, a router, an applications server, or any other device in the telecommunications network. In other embodiments, processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
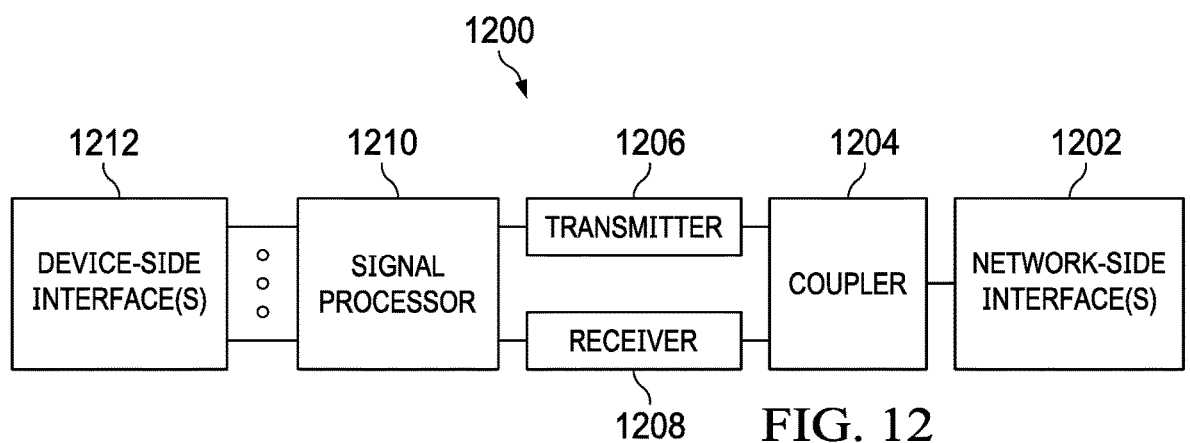
FIG. 12 illustrates a block diagram of an example transceiver, according to certain embodiments of the present disclosure.

FIG. 12 illustrates a block diagram of an example transceiver 1200, according to certain embodiments of the present disclosure. Transceiver 1200 is adapted to transmit and receive signals over a telecommunication network. In some embodiments, one or more of interfaces 1106, 1108, and 1110 shown in and described with reference to FIG. 11 connects processing system 1100 to a transceiver (e.g., transceiver 1200) adapted to transmit and receive signaling over the telecommunications network. The transceiver 1200 may be installed in a host device. As shown, transceiver 1200 comprises a network-side interface 1202, a coupler 1204, a transmitter 1206, a receiver 1208, a signal processor 1210, and a device-side interface 1212. Network-side interface 1202 may include any component or collection of components adapted to transmit or receive signaling over a wireless or wireline telecommunications network. Coupler 1204 may include any component or collection of components adapted to facilitate bi-directional communication over network-side interface 1202. Transmitter 1206 may include any component or collection of components (e.g., up-converter, power amplifier, etc.) adapted to convert a baseband signal into a modulated carrier signal suitable for transmission over network-side interface 1202. Receiver 1208 may include any component or collection of components (e.g., down-converter, low noise amplifier, etc.) adapted to convert a carrier signal received over network-side interface 1202 into a baseband signal. Signal processor 1210 may include any component or collection of components adapted to convert a baseband signal into a data signal suitable for communication over device-side interface(s) 1212, or vice-versa. Device-side interface(s) 1212 may include any component or collection of components adapted to communicate data-signals between signal processor 1210 and components within the host device (e.g., processing system 1100, LAN ports, etc.).

Transceiver 1200 may transmit and receive signaling over any type of communications medium. In some embodiments, transceiver 1200 transmits and receives signaling over a wireless medium. For example, transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., BLUETOOTH, near field communication (NFC), etc.). In such embodiments, network-side interface 1202 comprises one or more antenna/radiating elements. For example, network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Embodiments of the present disclosure may provide one or more technical advantages. For example, certain embodiments may allow a geographic location of a mobile device to be determined even when a generally accurate wireless-based mobile device positioning system, such as a global navigation satellite system (GNSS), becomes unavailable. Certain embodiments may allow a geographic location of a mobile device to be adjusted in multiple dimensions, which may correct a determined geographic location. For example, rather than simply relying on position propagation based on output from an accelerometer, which can be error prone, and using map matching to determine a closest road, embodiments of this disclosure access measurements from other sensors of the mobile device and compare information determined from those measurements and geographic data stored in geographic database to determine a particular geographic location that corresponds to the information determined from the sensor measurements. This may allow so-called along-track errors to be corrected (e.g., correction to a particular location along a road), as well as so-called across-track errors (e.g., correction to a correct road). Furthermore, depending on the particular data that is included in the geographic database and the particular sensors available on the mobile device, the multi-dimensional correction could also include a correction in a third dimension (e.g., based on an altitude of the mobile device determined according to measurements of an altitude sensor).

It should be understood that references throughout this description to "correct," "correction," "correcting" or the like of a geographic might or might not result in the determination of a perfectly correct physical geographic location of a mobile device. Embodiments of this disclosure provide techniques for confirming and/or adjusting a geographic location to potentially improve the accuracy of the determined geographic location or to provide an ability to determine a geographic location based on available information when other techniques for determining a geographic location are unavailable.

As another example, certain embodiments may allow data from a variety of types of sensors of a mobile device to be compared to geographic data to determine a geographic location of the mobile device. As described above, in certain embodiments, the data from the additional sensors may provide additional dimensions to a determined geographic location or corrections to a geographic location. In certain embodiments, the data from the variety of sensors may be used as backup that is analyzed if the mobile device is unable to determine a unique geographic location based on data from another sensor.

In certain embodiments, certain sensors of a mobile device and their associated measurements generally are available to the mobile device even when a wireless-based mobile device positioning system may not be available. For example, sensors and their associated measurements generally are available to the mobile device even when the mobile device is unable to determine a reliable geographic location using the GNSS. Thus, an ability to determine a geographic location of the mobile device based on data from one or more of the sensors may provide an ability to continue to determine a geographic location of the mobile device even when the wireless-based mobile device positioning system is unavailable or otherwise unreliable.

Although this disclosure describes particular components as performing particular operations, this disclosure contemplates other components performing those operations. Additionally, although this disclosure describes or illustrates particular operations as occurring in a particular order, this disclosure contemplates any suitable operations occurring in any suitable order. Moreover, this disclosure contemplates any suitable operations being repeated one or more times in any suitable order. Although this disclosure describes or illustrates particular operations as occurring in sequence, this disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A mobile device, comprising:
a wireless receiver configured to receive wireless signals as part of a wireless-based mobile device positioning system;
a gyroscope;
an altitude sensor;
one or more processors; and
a memory storing computer-executable instructions that, when executed by the one or more processors, cause the one or more processors to perform operations comprising:
determining a first geographic location based on the wireless signals received as part of the wireless-based mobile device positioning system;
accessing geographic data, the geographic data comprising a first mapping between road headings and particular geographic locations, the geographic data further comprising a second mapping between altitudes and particular geographic locations;
accessing a particular heading determined according to a measurement of the gyroscope;
determining a second geographic location based on the first geographic location, the particular heading, and the first mapping between road headings and particular geographic locations;
determining whether the second geographic location is reliable;
accessing, in response to determining that the second geographic location is unreliable, a particular altitude determined according to a measurement of the altitude sensor; and
determining a third geographic location based on the first geographic location, the particular altitude, and the second mapping between altitudes and particular geographic locations.

2. The mobile device of claim 1, wherein determining the second geographic location comprises adjusting the first geographic location to address an error in the first geographic location.

3. The mobile device of claim 1, wherein:
the second geographic location is different than the first geographic location in at least a first dimension and a second dimension; and
determining the second geographic location comprises adjusting the first geographic location in the first dimension to be on a particular road and adjusting the first geographic location in the second dimension along the particular road.

4. The mobile device of claim 1, wherein the operations for accessing the geographic data are performed in response to determining that a reliability of the first geographic location is below a predetermined threshold value.

5. The mobile device of claim 1, wherein the operations for accessing the geographic data are performed in response to detecting an inability to determine, using the wireless-based mobile device positioning system, a subsequent geographic location to the first geographic location.

6. The mobile device of claim 1, wherein:
the mobile device further comprises a magnetometer configured to measure a local magnetic field pattern in proximity to the mobile device;
the geographic data further comprises a third mapping between local magnetic field event patterns and particular geographic locations; and
the operations further comprise:
determining whether the third geographic location is reliable;
accessing, in response to determining that the third geographic location is unreliable, using the magnetometer, a particular local magnetic field pattern; and
determining a fourth geographic position based on the first geographic location, the particular local magnetic field pattern and the third mapping between local magnetic field event patterns and particular geographic locations.

7. The mobile device of claim 1, wherein the wireless receiver comprises a global navigational satellite system (GNSS) receiver configured to determine the first geographic location based on signals received from one or more GNSS satellites.

8. The mobile device of claim 1, wherein the wireless receiver comprises components of a Wi-Fi network, a BLUETOOTH network, a cellular network, or a combination thereof.

9. The mobile device of claim 1, wherein the mobile device is a vehicle, a mobile phone, a wearable device, or a mobile computing device.

10. The mobile device of claim 1, wherein the gyroscope is part of an inertial measurement unit (IMU) that further comprises an accelerometer.

11. The mobile device of claim 1, wherein:
the mobile device further comprises a navigation system; and
the operations further comprise providing the second geographic location to the navigation system.

12. The mobile device of claim 1, wherein the second geographic location is different than the first geographic location.

13. A mobile device, comprising:
a first sensor;
a wireless receiver configured to receive wireless signals as part of a wireless-based mobile device positioning system;
one or more processors; and
a memory storing computer-executable instructions that, when executed by the one or more processors, cause the one or more processors to perform operations comprising:
determining a first geographic location based on the wireless signals received as part of the wireless-based mobile device positioning system;
accessing geographic data, the geographic data comprising identifiers of a plurality of geographic locations and properties associated with the geographic locations of the plurality of geographic locations, and a first mapping between measureable values of a first type and particular geographic locations of the plurality of geographic locations;
determining, using the geographic data, a set of candidate geographic locations for adjusting the first geographic location, the set of candidate geographic locations being ones of the plurality of geographic locations that are closest to the first geographic location;
accessing a particular value of the first type determined according to a measurement of the first sensor; and
determining a second geographic location based on the set of candidate geographic locations, the particular value of the first type, and the first mapping between the measurable values of the first type and particular geographic locations, the second geographic location being one of the set of candidate geographic locations that is mapped to a measurable value that matches the particular value of the first type.

14. The mobile device of claim 13, wherein the set of candidate geographic locations correspond to a road segment of a road, the properties associated with the candidate geographic locations in the geographic data indicating the road.

15. The mobile device of claim 13, wherein:
the first sensor is a gyroscope;
the first type comprises headings; and
the particular value of the first type comprises a heading.

16. The mobile device of claim 13, wherein:
the first sensor is a altimeter or pressure sensor;
the first type comprises altitude; and
the particular value of the first type comprises an altitude.

17. The mobile device of claim 13, wherein:
the first sensor is a magnetometer;
the first type comprises local magnetic field events; and
the particular value of the first type comprises a local magnetic field pattern.

18. The mobile device of claim 13, wherein:
the first sensor is a light detection and ranging (LiDAR) sensor;
the first type comprises three-dimensional point cloud geographic positions; and
the particular value of the first type comprises three-dimensional point cloud geographic positions.

19. The mobile device of claim 13, wherein:
the mobile device further comprises a second sensor;
the geographic data further comprises a second mapping between measureable values of a second type and particular geographic locations of the plurality of geographic locations;
the operations further comprise accessing a particular value of the second type determined according to a measurement of the second sensor; and
the second geographic location is further determined based on the particular value of the second type and the second mapping between the measurable values of the second type and particular geographic locations.

20. A mobile device, comprising:
a first sensor, wherein the first sensor is a gyroscope;
a second sensor, wherein the second sensor is an altitude sensor;
a wireless receiver configured to receive wireless signals as part of a wireless-based mobile device positioning system from a component distinct from the mobile device;
one or more processors; and
a memory storing computer-executable instructions that, when executed by the one or more processors, cause the one or more processors to perform operations comprising:
determining a first geographic location based on the wireless signals received as part of the wireless-based mobile device positioning system;
accessing geographic data, the geographic data comprising:
identifiers of a plurality of geographic locations;
a mapping between measureable values of a first type and particular geographic locations of the plurality of geographic locations; and
a mapping between measureable values of a second type and particular geographic locations of the plurality of geographic locations;
determining, using the geographic data, a set of candidate geographic locations for adjusting the first geographic location;
accessing a particular value of the first type determined according to a measurement of the first sensor;
determining a second geographic location based on the set of candidate geographic locations, the particular value of the first type, and the mapping between the measurable values of the first type and particular geographic locations;
determining whether the second geographic location is reliable;
accessing, in response to determining that the second geographic location is unreliable, a particular value of the second type determined according to a measurement of the second sensor; and
determining a third geographic location based on the set of candidate geographic locations, the particular value of the second type, and the mapping between the measurable values of the second type and particular geographic locations.

* * * * *